US012698886B2

(12) United States Patent
Henrici et al.

(10) Patent No.: US 12,698,886 B2
(45) Date of Patent: Aug. 4, 2026

(54) APPLIANCE LIGHT

(71) Applicant: BJB GmbH & Co. KG, Arnsberg (DE)

(72) Inventors: Philipp Henrici, Arnsberg (DE); Olaf Baumeister, Sundern (DE); Joerg Harnischmacher, Menden (DE)

(73) Assignee: BJB GmbH & Co. KG, Werler Strasse (DE)

( * ) Notice: Subject to any disclaimer, the term of this patent is extended or adjusted under 35 U.S.C. 154(b) by 0 days.

(21) Appl. No.: 19/348,997

(22) Filed: Oct. 3, 2025

(65) Prior Publication Data

US 2026/0092696 A1 Apr. 2, 2026

Related U.S. Application Data

(63) Continuation of application No. 18/238,492, filed on Aug. 27, 2023, now Pat. No. 12,460,796.

(30) Foreign Application Priority Data

Sep. 19, 2022 (DE) .......................... 102022123917.9

(51) Int. Cl.
| | |
|---|---|
| *F21V 19/00* | (2006.01) |
| *F21V 8/00* | (2006.01) |
| *F21Y 115/10* | (2016.01) |
| *F24C 15/00* | (2006.01) |

(52) U.S. Cl.
CPC ........ *F21V 19/0035* (2013.01); *F21V 19/004* (2013.01); *F24C 15/008* (2013.01); *G02B 6/0005* (2013.01); *F21Y 2115/10* (2016.08)

(58) Field of Classification Search
CPC ...... F24C 15/008; F21V 17/00; F21V 17/005;

F21V 17/06; F21V 17/16; F21V 17/162; F21V 17/164; F21V 19/0035; F21V 19/004; F21V 33/0044; F21W 2131/307; G02B 6/0005; G02B 6/0006; G02B 6/0008; G02B 6/001; F21Y 2115/10; H05B 6/6444; H05B 3/0076

See application file for complete search history.

(56) References Cited

U.S. PATENT DOCUMENTS

| | | | |
|---|---|---|---|
| 2009/0316385 A1* | 12/2009 | Weber ....................... | F21K 9/61 |
| | | | 362/310 |
| 2021/0278089 A1* | 9/2021 | Henrici ................... | F21V 17/06 |

FOREIGN PATENT DOCUMENTS

DE 202015104575 U1 * 10/2015 .......... F21V 33/0044

* cited by examiner

*Primary Examiner* — Erin Kryukova
(74) *Attorney, Agent, or Firm* — Von Rohrscheidt Patents

(57) ABSTRACT

A cooking appliance light including an illuminant formed by a circuit board and a LED arranged on the circuit board; a light conductor rod including a light entry surface for light emitted by the LED; a holder including a circuit board receiver arranged on a bottom side of the holder, a fixing element arranged on a top side of the holder opposite to the bottom side and configured to receive the light conductor rod, and a cut out arranged in a portion of the fixing element wherein light emitted by the LED arranged on the bottom side of the holder radiates through the cut out to the light conductor rod arranged on the top side of the holder, wherein the light conductor rod includes an essentially circumferential annular protrusion arranged in a radial plane and integrally provided in one piece with or bonded to the light conductor rod.

2 Claims, 24 Drawing Sheets

30

G

11

38

34

APPLIANCE LIGHT

RELATED APPLICATIONS

This application is a continuation of U.S. patent application Ser. No. 18/238,492 which claims priority from and incorporates by reference German Patent Application DE 10 2022 123 917.9 filed on Sep. 19, 2022.

FIELD OF THE INVENTION

The invention relates to an light, in particular an appliance light, in particular a cooking apparatus light, comprising: an illuminant formed by a circuit board including an LED arranged thereon, a light conductor rod, including a light entry surface for light emitted by the LED, a holder including a circuit board receiver on a bottom side and a fixing element configured to receive the light conductor rod on a top side arranged opposite to the bottom side wherein the holder includes a cut out in a portion of the fixing element wherein light emitted by the LED arranged on the bottom side radiates through the cut out to the light conductor rod arranged on the top side.

BACKGROUND OF THE INVENTION

A generic light is disclosed in DE 20 2020 101 157 U1 owned by applicant. In this document a light conductor rod is inserted into a fixing element configured as a sleeve. The light conductor rod includes a relief cut at an outer circumference. Differently configured safety elements engage the relief cut in different embodiments and thus anchor the light conductor rod at the holder. Thus, the publication proposes spring elastic plugs or interlocking lugs functioning as safety elements. This facilitates a form locking fixing of the light conductor rod within the fixing element of the holder.

DE 10 2018 111 092 A1 shows a similar light where the light conductor rod is inserted in a sleeve shaped fixing element. The sleeve body, however, is configured slotted so that its walls are deformable in a radial direction. The sleeve body is enveloped by a clamping ring that presses the sleeve walls against the light conductor rod. This creates friction locking between the sleeve wall and the light conductor rod which supports the light conductor rod in the fixing element.

Fixing options for supporting light conductor rods in a holder of a light, in particular an appliance light or a cooking apparatus light are known in the art, though form locking connections are preferred over friction locking connections in particular installation situations. However, there is room for improvement with respect to ease of assembly.

BRIEF SUMMARY OF THE INVENTION

Thus, it is an object of the invention to provide a light with an alternative light conductor rod attachment.

The object is achieved by a cooking appliance light including an illuminant formed by a circuit board and a LED arranged on the circuit board; a light conductor rod including a light entry surface for light emitted by the LED; a holder including a circuit board receiver arranged on a bottom side of the holder, a fixing element arranged on a top side of the holder opposite to the bottom side and configured to receive the light conductor rod, and a cut out arranged in a portion of the fixing element wherein light emitted by the LED arranged on the bottom side of the holder radiates through the cut out to the light conductor rod arranged on the top side of the holder, wherein the light conductor rod includes an essentially circumferential annular protrusion arranged in a radial plane and integrally provided in one piece with or bonded to the light conductor rod, wherein the light conductor rod is fixed in the fixing element of the holder by the essentially circumferential annular protrusion by positive form locking, wherein the essentially circumferential annular protrusion is an essentially circumferential flange arranged at an end of the light conductor rod proximal to the light entry surface of the light conductor rod, wherein the fixing element of the holder is a hollow cylinder with a cylinder wall that includes an inner circumferential recess configured as a ring groove section or a ring groove in a radial plane, wherein the circumferential protrusion of the light conductor rod is seated in the ring groove section or the ring groove fixed by positive form locking wherein the ring groove section or the ring groove is formed at an end of the cylinder wall that is proximal to the holder, wherein the cylinder wall of the fixing element is circumferentially closed at an end that is distal from the holder, and wherein the light conductor rod is inserted in a light exit direction through the cutout into the fixing element.

As an essential advantage of the invention the light conductor rod is supported in the fixing element of the holder by positive form locking which precludes a sliding of the light conductor rod from the holder when the light is transported or during assembly. The circumferential protrusion used for the form locking connection, that extends radially outward from the longitudinal axis of the light conductor rod is advantageous over the prior art with respect to light losses within the light conductor rod. A circumferential relief cut that is not introduced into the light conductor rod in view of the light exit angle of the LED and the distance from the light exit plane of the LED reduces a cross section that is available for light conduction and may introduce light exit surfaces into the light conductor rod. Light fed into the light conductor rod then exits through the light exit surfaces that are arranged in a portion of the fixing element of the holder which causes a certain amount of light loss.

The form locking fixing of the light conductor rod by a circumferential protrusion provides greater freedom of design for the light to implement the mechanical fixation of the light conductor rod in the holder, without any concern with respect to potential light losses through circumferential relief cuts that are known in the art, and without having to maintain particular distances between the light exit surface of the LED and a circumferential relief cut in view of the light exit angle of the LED.

The circumferential protrusion in addition to mechanically fixing the light conductor rod in the holder can also be used to position the light conductor rod in a defined orientation in the holder. This is possible in particular when the circumferential protrusion is only formed along a portion of a circumferential line and the fixing element of the holder includes a recess that receives the circumferential protrusion. This assures that the circumferential protrusion can only be inserted into the fixing element in one orientation relative to the holder and fixed therein.

It is provided in a particularly advantageous embodiment that the circumferential protrusion is essentially a circumferential flange at an end of the light conductor rod that is proximal to the light entry surface of the light conductor rod.

This embodiment has a significant advantage in that the light conductor rod is configured rotation symmetrical at least with respect to its attachment device that is configured as the flange which simplifies fabrication of the light conductor rod considerably.

The arrangement of the flange at the end of the light conductor rod that forms the light entry surface increases the light entry surface by the flange width. This way more light can be fed into the light conductor rod when the LED is configured accordingly.

In particular when the transition in light exit direction between the flange and the light conductor rod is configured optically correct, a total reflection of the light is also assured in the transition portion so that a light exit in the transition portion is reliably prevented by the increased light infeed surface of the light conductor rod.

The flange furthermore has the advantage that the orientation of the light conductor rod when mounted in the fixing element of the holder is irrelevant due to rotation symmetry which substantially simplifies assembly.

The fixing element of the holder is a hollow cylindrical component with a cylinder wall that includes a recess at an inner circumference in a radial plane, in particular a recess configured at least as ring groove section, wherein the circumferential protrusion of the light conductor rod interlocks in the recess by positive form locking, in particular when the recess at the inner circumference is provided in particular as a ring groove section at an end of the cylindrical wall that is proximal to the holder.

These features of the invention assure that a complementary structure adapted to the circumferential protrusion of the flange is provided in the fixing element. This complementary structure receives the protrusion according to the invention, typically the flange. This provides a tension proof form locking connection in the light exit direction which reliably supports the light conductor rod in the holder of the light.

A safety element supports the light conductor rod in the cylinder wall of the fixing element in an advantageous embodiment.

The safety element secures the light conductor rod inserted in the fixing element in an assembly direction against a movement in the opposite direction and thus secures the light conductor rod in the fixing element.

According to an embodiment of the invention, the cylinder wall of the fixing element has a circumferential relief about the longitudinal axis of at least 180 degrees and the light conductor rod is inserted into the cylindrical space of the fixing element transversal to the longitudinal axis of the cylinder wall. Thus, the light conductor rod is inserted through the circumferential relief cut into the fixing element.

This embodiment of the fixing element facilitates inserting the light conductor rod into the fixing element transversal to the light exit direction. This assembly can be performed in a particularly simple and easy manner and facilitates easy replacement of a damaged light conductor rod even when the light is mounted.

Thus, the safety element can be a safety ring that radially envelops the cylinder wall of the fixing element, in particular an elastomeric material ring that is advantageously inserted into a safety ring groove that is fabricated in an outer circumference of the cylinder wall.

Using the annular safety element, the light conductor rod can be anchored in the fixing element in a particularly simple manner against sliding out transversal to the light exit direction. An elastomeric material ring is advantageously used according to the invention since it can be handled in a particularly simple manner. A slotted ring element made from reset elastic material can be used as a safety ring, wherein the slotted ring element expands when applied to the cylinder wall of the fixing element due to the slot and resets when reaching the safety ring groove. Metals or synthetic materials are useable as reset elastic materials. Their essential advantage is their higher service life at high temperatures. These high temperatures are typically a consideration in cooking appliances, in particular in pyrolysis capable ovens, with respect to service life of the materials used.

An alternative fixing element is characterized in that the cylinder wall forms at least one reset elastic safety lobe that protrudes into the circumferential relief cut, wherein the safety lobe restricts the circumferential relief cut in a radial plane and contacts an outer circumference of the light conductor rod as a safety element.

Also in this embodiment, the light conductor rod is introduced into the fixing element of the holder transversal to the light exit direction. Thus, the safety lobes slide on an outer circumference of the light conductor rod and are spread so that they reset when the light conductor rod is inserted into the fixing element in a correct position. Thus, the safety lobes reach around the light conductor rod and secure the light conductor rod against sliding out of the fixing element against the assembly direction.

The essential advantage of this embodiment is not requiring a separate safety element. Ideally, the safety lobes are an integral or bonded part of the cylinder wall. This is simple to do from a fabrication point of view and facilitates assembly since only the light conductor rod has to be inserted without having to apply a separate safety element.

In another advantageous embodiment, it is also conceivable to close the cylinder wall of the fixing element on an entire circumference.

In this embodiment of the safety element the light conductor rod is inserted along the light exit direction through the cutout of the holder into the fixing element. Then it is sufficient to mount the circuit board at the holder. This prevents a sliding back of the light conductor rod against the assembly direction. Thus, the circuit board forms the safety element for the light conductor rod.

In order to prevent a direct contacting between the light conductor rod and the circuit board and in order to compensate for fabrication tolerances and/or provide a firm seat of the light conductor rod, in particular in the light exit direction in the fixing element, a spacer element shall be inserted between the circuit board and the light conductor rod. This spacer element can be provided in many shapes. An elastomeric material ring has proven particularly advantageous in initial tests wherein the elastomeric material ring is at least compressed by a minimum amount when assembling the circuit board so that the circuit board applies a compression force in the light exit direction upon the light conductor rod supported in the fixing element.

However, it is conceivable to provide the circuit board with spacer elements during assembly wherein the spacer elements advantageously have elastic properties. Silicon material can be used to cover the LEDs mounted on the circuit board.

In an advantageous embodiment of the invention, an interlocking tongue is cut out of a wall section wherein an end of the interlocking tongue which is proximal to the cutout flexes out radially in a reset elastic manner and interlocks with the flange of the light conductor rod.

Also, in this embodiment the light conductor rod is inserted through the cutout of the holder into the fixing element in the light exit direction. The interlocking tongue of the wall section reaches behind the circumferential protrusion or the flange of the light conductor rod and thus secures the light conductor rod against sliding out against the assembly direction. It is appreciated that also this embodiment can include an additional spacer element between the circuit board and the light entry surface of the light conductor rod. Alternatively, it is conceivable to prevent a flexing of the interlocking tongue in a direction away from the longitudinal axis of the light conductor rod by applying a safety ring on the outer circumference of the cylinder wall of the fixing element and thus providing an additional safety for the light conductor rod.

BRIEF DESCRIPTION OF THE DRAWINGS

Further advantages of the invention will be apparent from the subsequent description of an advantageous embodiment with reference to drawings figures, wherein.

DETAILED DESCRIPTION OF THE INVENTION

Figure 1:
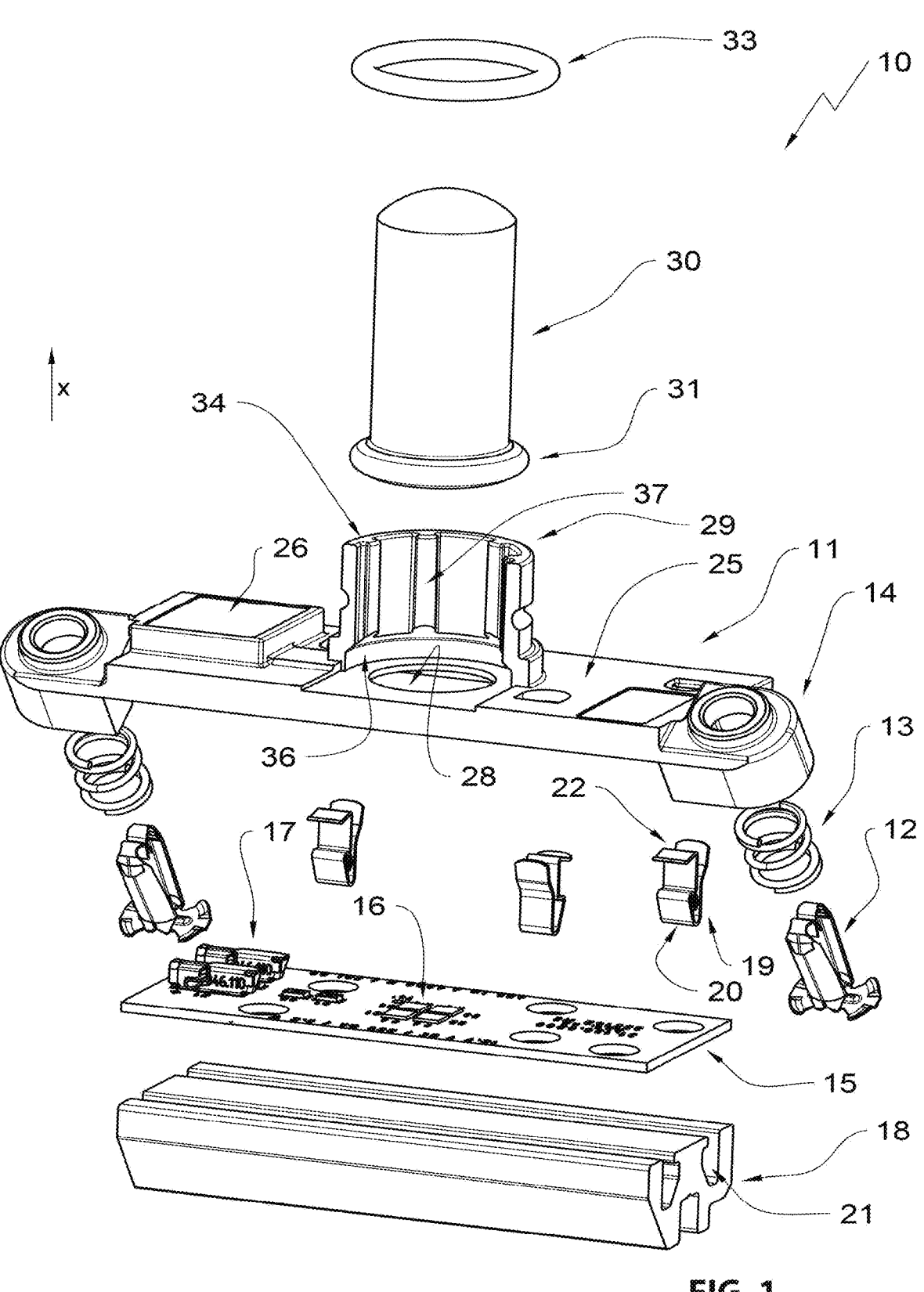
FIG. 1 illustrates a first embodiment of the invention in a first exploded view.

The invention is subsequently described based on four embodiments with reference to FIGS. 1 through 20.

Identical or like components are designated with identical reference numerals in the different embodiments.

A light according to the invention is designated overall with the reference numeral 10 in the drawing figures. A first embodiment of the light according to the invention is illustrated in FIGS. 1-8.

Figure 2:
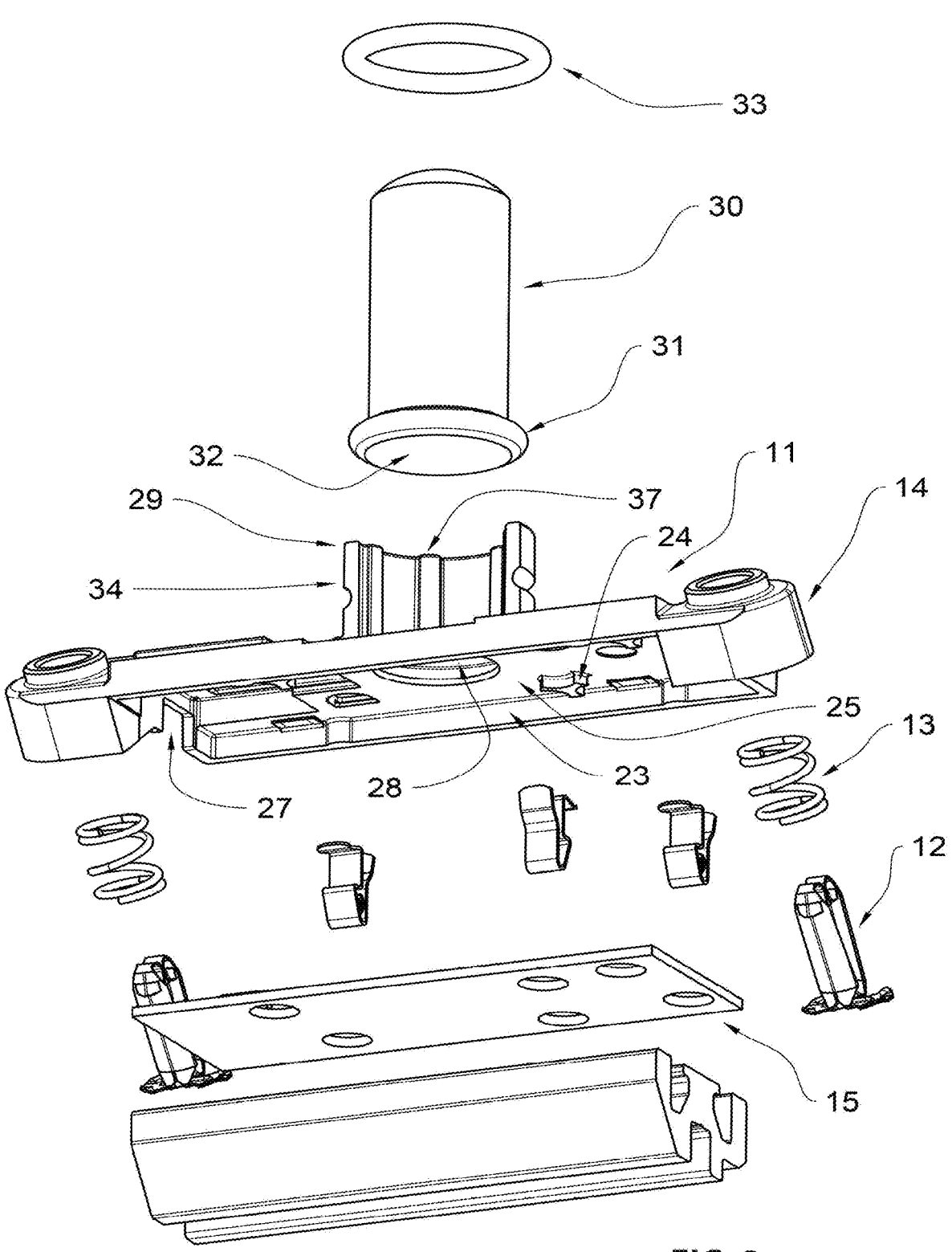
FIG. 2 illustrates the embodiment according to FIG. 1 in a second exploded view.

Descriptions that apply to all embodiments are now provided with reference to FIGS. 1 and 2.

The light 10 includes a holder 11. The holder 11 connects and aligns all components of the light 10. Furthermore, the holder 11 arranges the light 10 at a support element of an appliance, in particular a cooking apparatus in various embodiments of the invention. Studs 12 are used for this purpose and inserted through coil springs 13 into bolt receivers 14. The support element includes a hole pattern and the studs 12 are insertable through the hole pattern. The coil springs 13 are provided with a spring preload when mounting the light 10 at the support element. The spring forces facilitate compensating dimensional tolerances and thermally induced material expansions in cooking appliances like ovens. The spring forces provide a secure and vibration-proof fixing of the light 10 at a support element of the appliance.

A circuit board 15 includes at least one LED 16 functioning as a light source from which light is emitted in the light exit direction X. Terminals 17 that are soldered onto the circuit board 15 electrically connect the circuit board 15 to an energy source by insertable conductors.

The circuit board 15 is placed onto a reaction bearing 18, in particular configured as a cooling body. For this purpose, interlocking spring elements 19 are used that include a base 20 that interlocks in an attachment groove 21 of the reaction bearing and whose support arms 22 contact a topside of the circuit board 15 that is oriented away from the reaction bearing 18 and press the circuit board against the reaction bearing 18.

The holder 11 forms a circuit board receiver 23 on a bottom side of the holder oriented towards the reaction bearing 18. The circuit board receiver 23 may include spacers 24 that protrude towards the reaction bearing 18. The spacers 24 provide a space between the cover wall 25 of the holder 11 and the circuit board surface of the electronic components placed on the circuit board 15 like, e.g., the LED 16 or the control chips. Additionally, a cooling flow can be run through the open space thus created in order to dissipate heat generated by the LED 16.

Mandrels designated as spacers 24 can also serve as encoding receivers for the circuit board 15. Thus, the mandrels engage corresponding recesses of the circuit board 15.

The cover wall 25 of the holder 11 forms a covering receiver 26 for the terminals 17 wherein the covering receiver includes a conductor insertion opening 27 on a lateral outside.

The holder 11 includes a cutout 28 in the cover wall 25 wherein the cutout 28 is above the LED 16 in the light exit direction X. Light emitted by the LED 16 exits through the cutout 28 of the cover wall 25 from the holder 11.

A hollow cylindrical or sleeve-shaped fixing element is a central component of the holder 11 and arranges a light conductor rod 30 at the holder 11 by positive form locking. The four described embodiments differ essentially in the configuration of the fixing element 29 which will be described in detail infra. The light conductor rod 30 is a cylindrical component and configured circular cylindrical in the instant embodiment. Different cross-sections, however, are within the scope and spirit of the invention.

The light conductor rod 30 includes a circumferential protrusion. This means the light conductor rod material protrudes from the circumferential surface radially away from the longitudinal axis of the light conductor rod 30. The circumferential protrusion is implemented at a circumferential flange 31 in the advantageous embodiments and arranged at an end of the light conductor rod 30 proximal to the circuit board 15. Put differently, the flange 31 is arranged at the end of the light conductor rod 30 that forms a light entry surface 32 of the light conductor rod.

In order to secure the light conductor rod 30 in the fixing element 29 according to the first embodiment of the invention according to FIGS. 1 through 8, a safety ring 33 is provided and its function will also be described infra.

Figure 3:
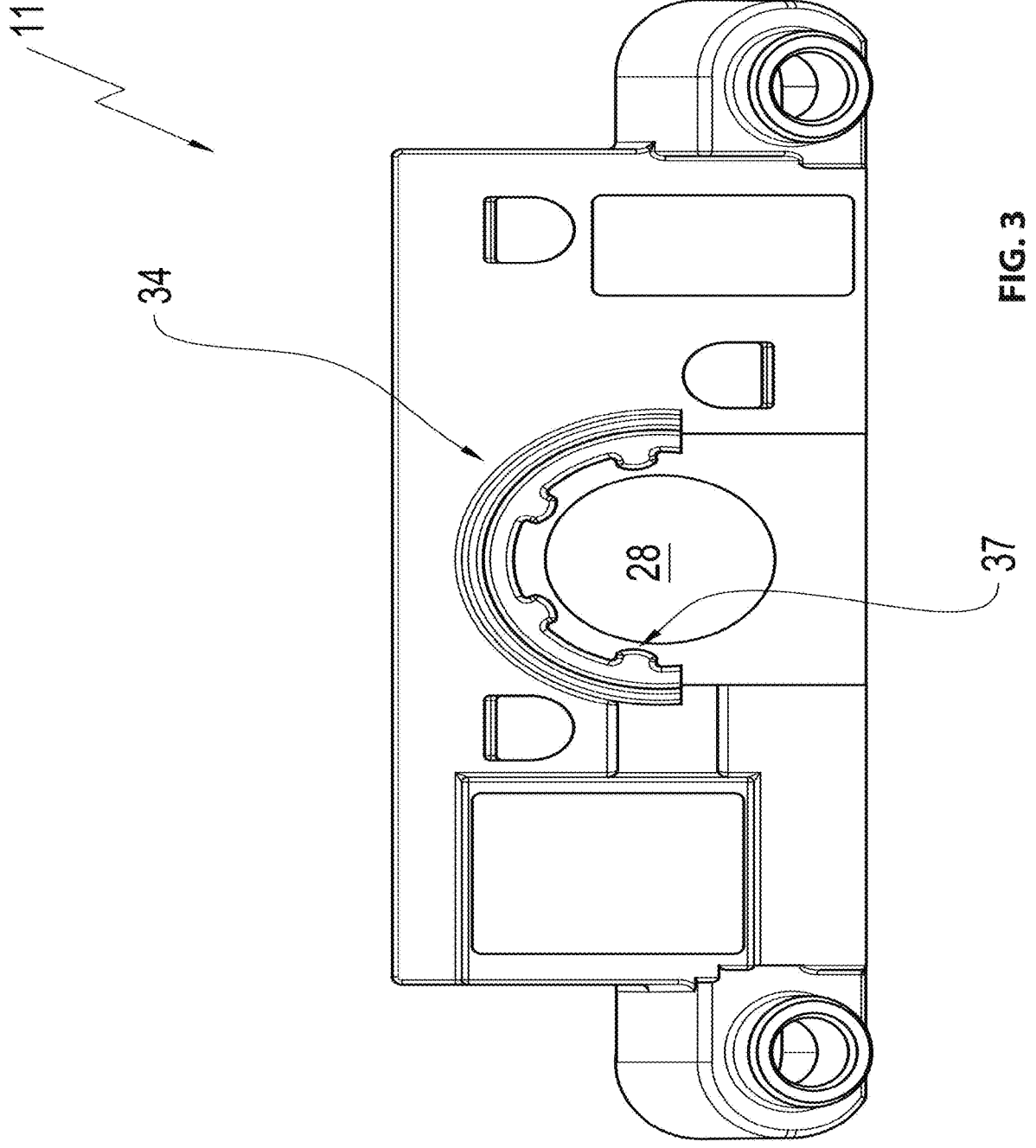
FIG. 3 illustrates a top view of the holder according to the embodiment according to FIG. 1.

As evident from FIGS. 1 through 3 with respect to the first embodiment, the hollow cylindrical fixing element 29 of the first embodiment includes a cylinder wall 34 forming the hollow cylinder. The cylinder wall 34 includes a safety ring groove 35 in an outer surface. The cylinder wall 34 originates from the cover wall 25 of the holder 11 in the light exit direction X and envelopes the cutout 28. The inner circumferential surface of the cylinder wall 34 includes a ring groove section 36 at an end proximal to the cover wall 25 wherein the ring groove section 36 extends in its entirety along the inner circumference of the cylinder wall 34. As evident from FIGS. 1 and 2, in particular also from the top view of the holder according to FIG. 3, the cylinder wall 34 only runs with a circumferential angle of 180 degrees about the cutout 28. The hollow cylindrical fixing element 29 according to the first embodiment of the invention is configured as a vertically cut half cylinder. It is furthermore evident from the drawing figures that the inner circumferential surface of the cylinder wall is provided with centering bars 37 that support the light conductor rod in the vertical direction centered in the fixing element.

Figure 4A:
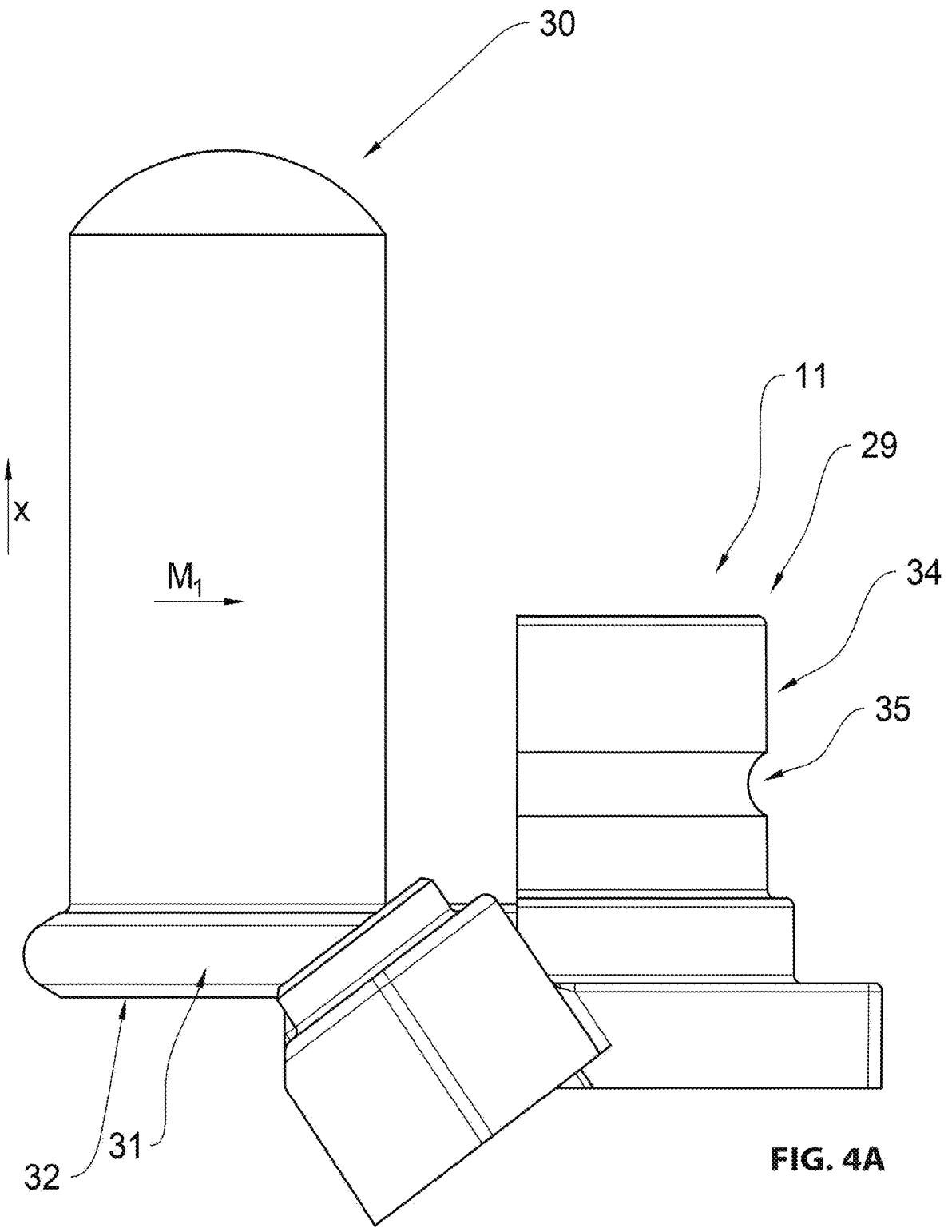
FIG. 4A illustrates the light conductor rod and the holder according to the embodiment of FIG. 1 in a preassembled condition.
Figure 4B:
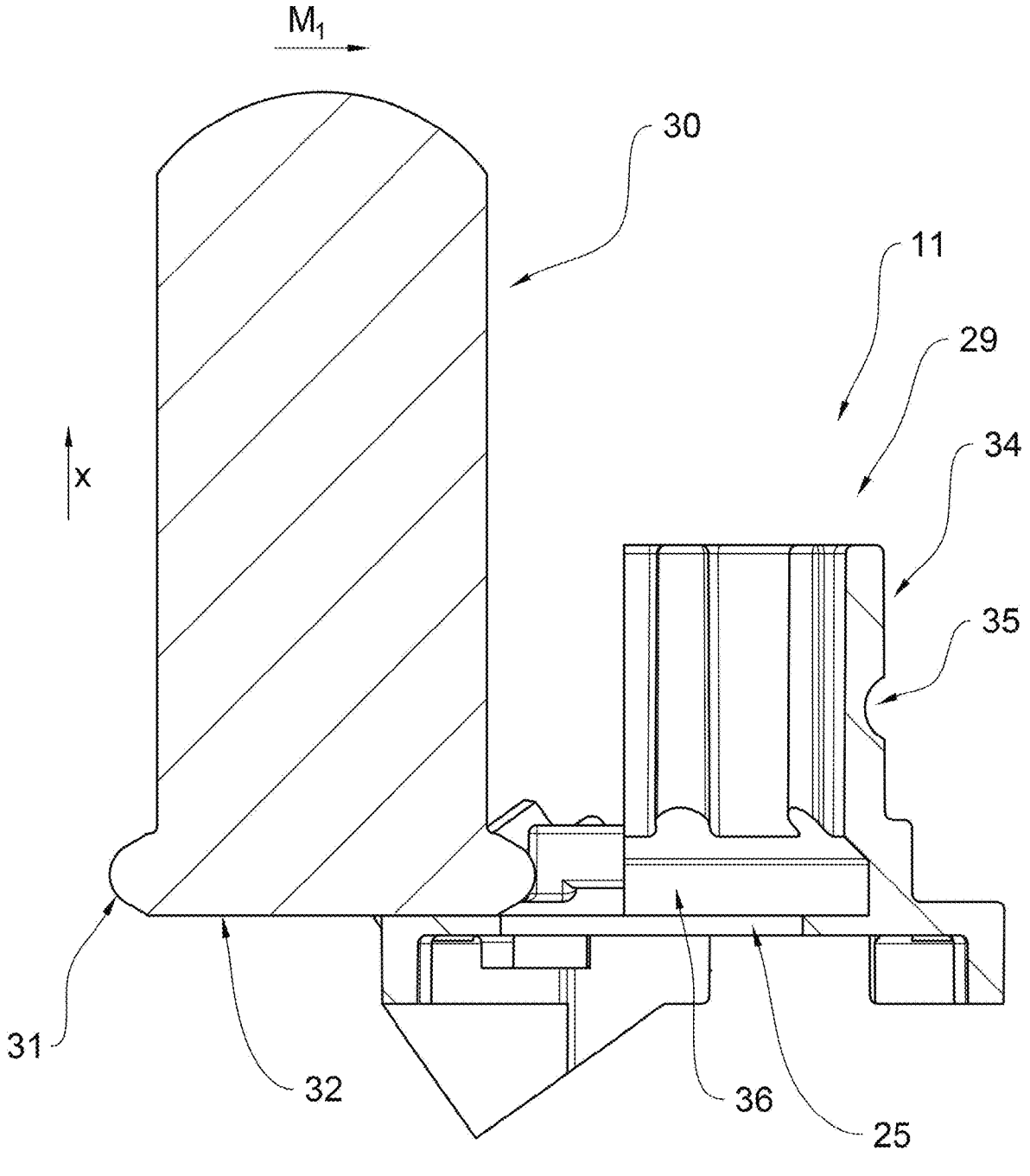
FIG. 4B illustrates the view according to FIG. 4A in a longitudinal cut.

FIG. 4A shows the holder 11 and the light conductor rod 30 in a side view in a preassembled condition. Thus, the light conductor rod 30 is positioned with its light exit surface 32 at a level of topside of the cover wall 25 of the holder 11 and is arranged adjacent to the cylinder wall opening not delimited by the cylinder wall 34. FIG. 4B shows the embodiment of FIG. 4A in a sectional view. According to this sectional view, the flange 31 of the light conductor rod 30 is arranged at a level of the ring groove section 36 of the cylinder wall 34. An arrow indicates the assembly direction M1 wherein the light conductor rod 30 is inserted through the cylinder wall opening into the fixing element 29. Thus, the flange 31 engages the ring groove section 36. This way the light conductor rod 30 is supported by positive form locking in the light exit direction X in the cylinder wall 34 of the fixing element 29.

Figure 5A:
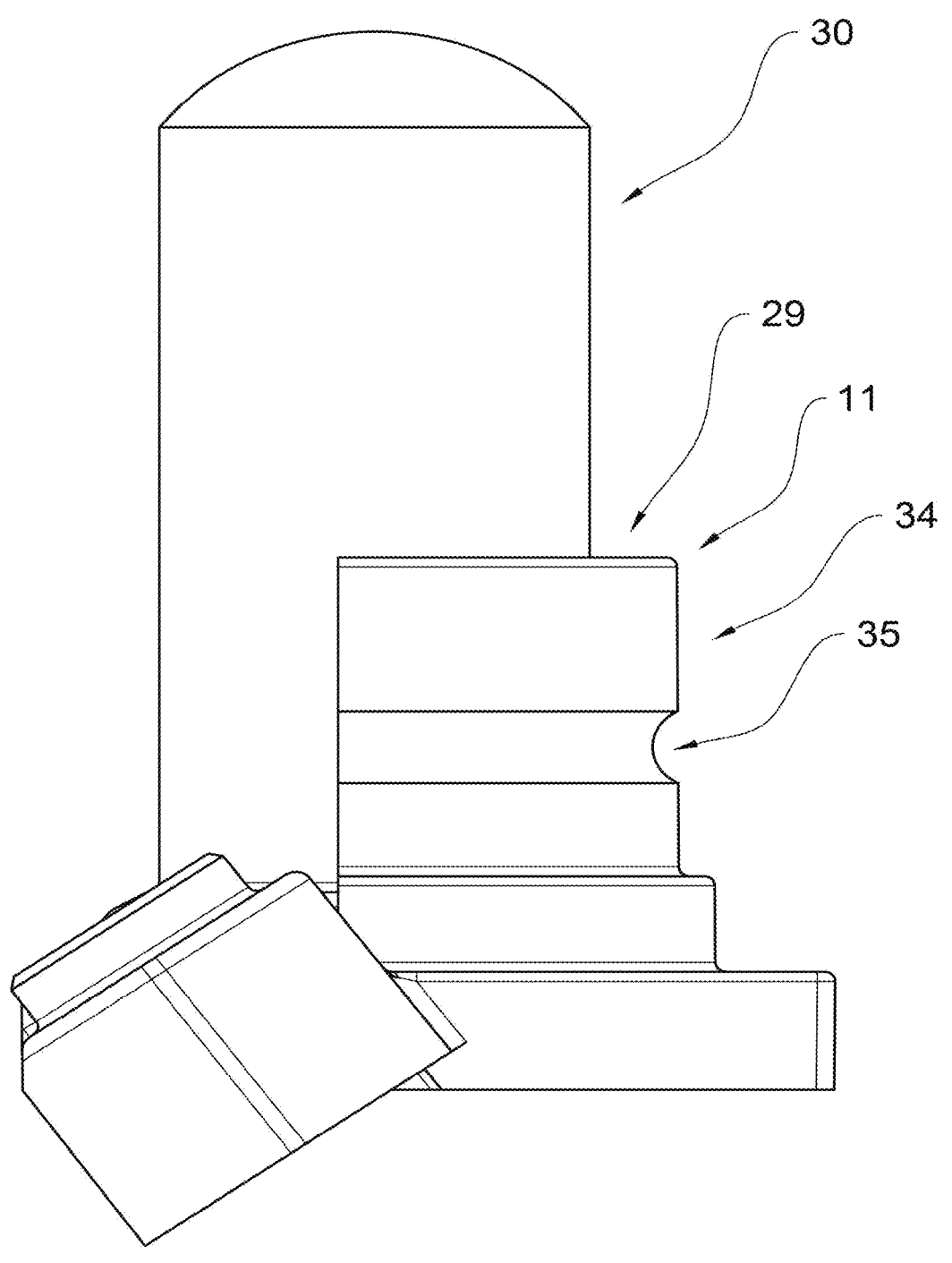
FIG. 5A illustrates the light conductor rod and the holder according to the embodiment according to FIG. 1 in an assembled position.
Figure 5B:
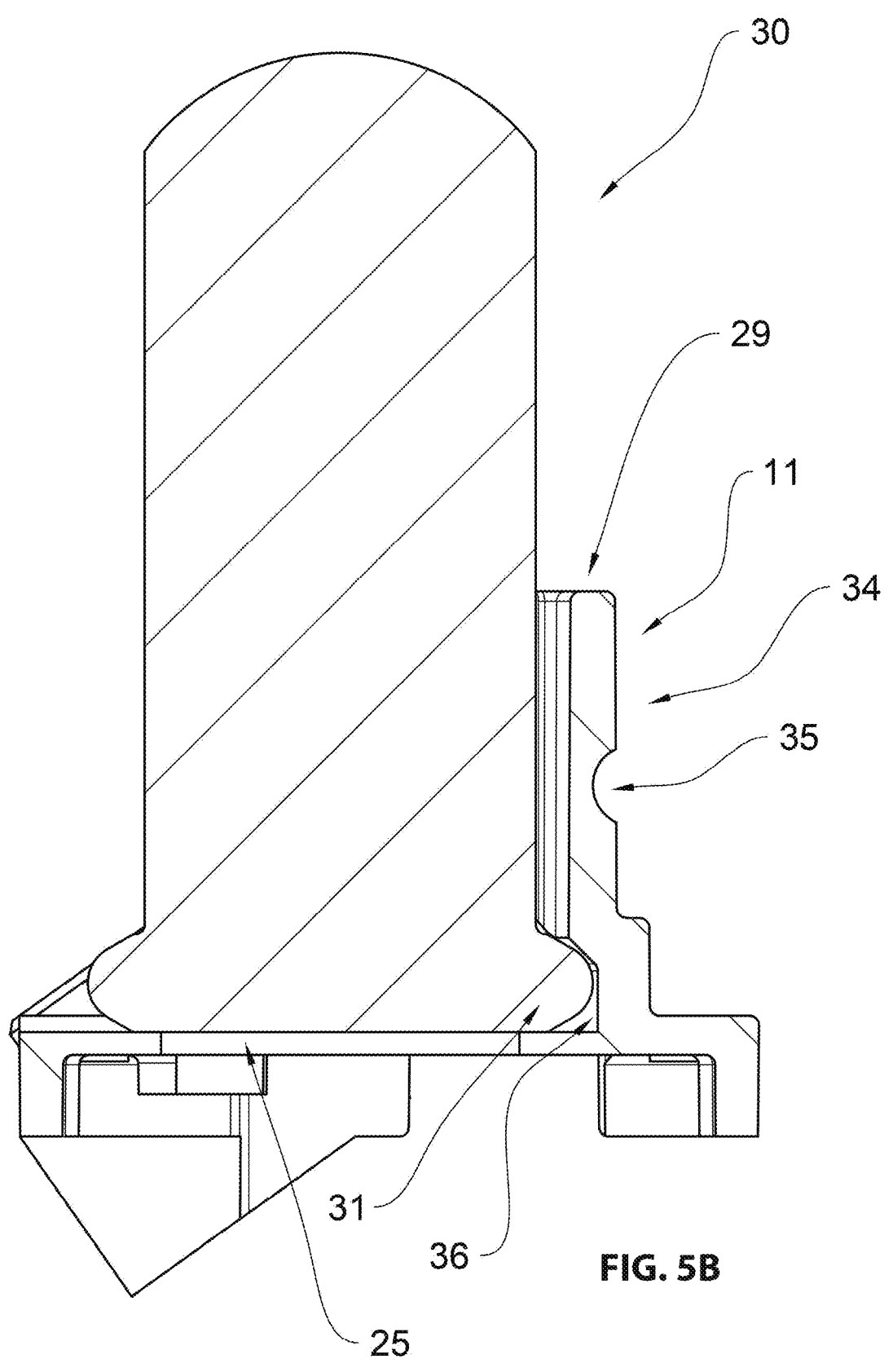
FIG. 5B illustrates a sectional view of FIG. 5A.

FIG. 5A shows a side view of the assembly position of the holder 11 and the light conductor rod 30 and FIG. 5B shows a corresponding sectional view. According to FIG. 5A, the cylinder wall 34 envelopes about half a circumference of the light conductor rod since the cylinder wall 34 has a circumferential angle of 180 degrees. FIG. 5B shows the engagement of the flange 31 of the light conductor rod 30 in ring groove sections 36 of the cylinder wall 34.

Figure 6:
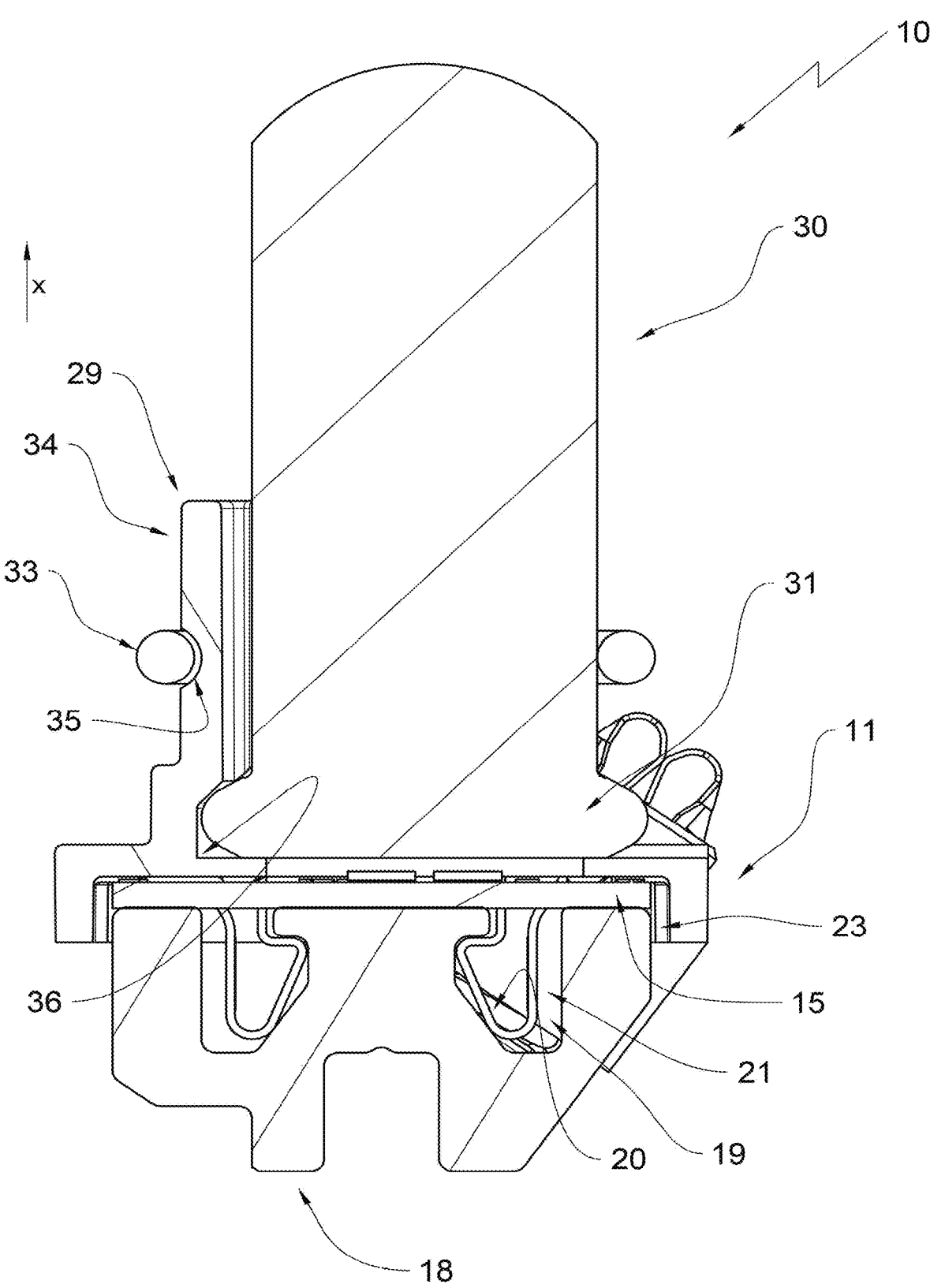
FIG. 6 illustrates a first vertical sectional view through the embodiment according to FIG. 1.
Figure 7:
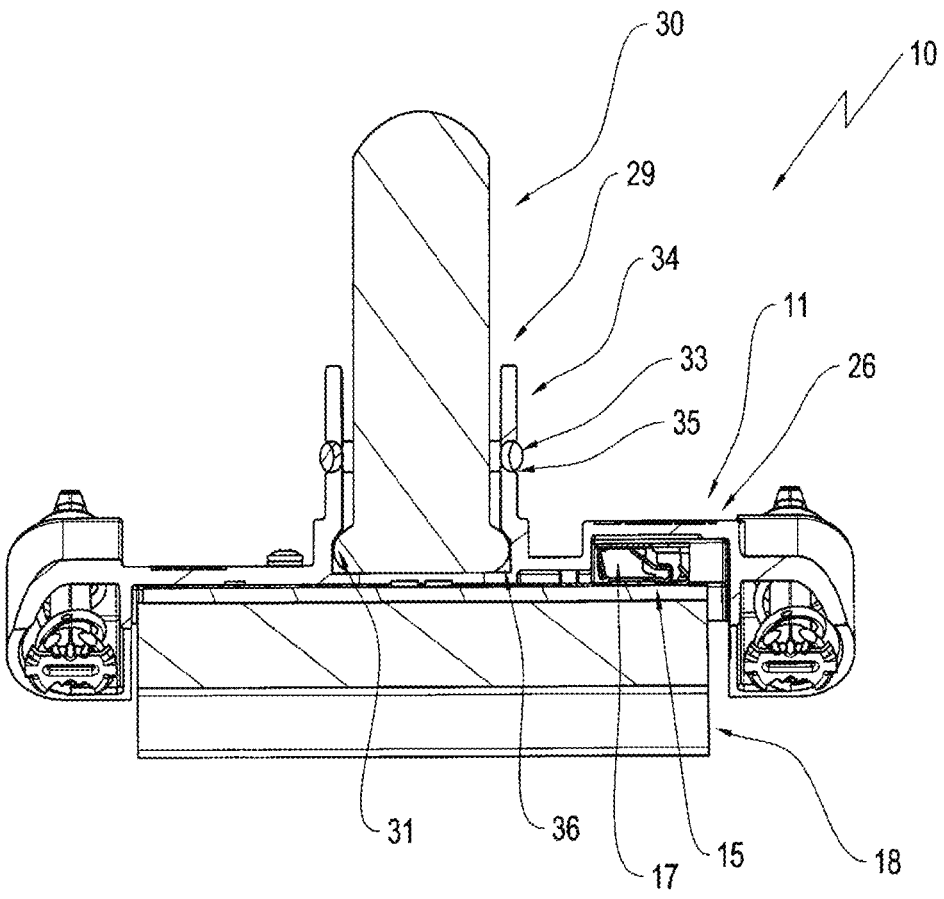
FIG. 7 illustrates a second vertical sectional view through the embodiment according to FIG. 1.

FIG. 6 shows a lateral sectional view of the complete light 10 illustrating how the circuit board 15 is placed within the circuit board receiver 23 of the holder 11 and how the interlocking spring elements 19 are anchored with their respective base 20 in the attachment groove 21 of the reaction bearing 18 configured as the cooling body. The light conductor rod 30 is seated in the fixing element 29 according to FIGS. 5A and 5B, wherein the flange 31 of the light conductor rod 30 is inserted in the ring groove section 36 of the cylinder wall 34.

The safety ring 33 is slid onto the light conductor rod 30 opposite to the light exit direction X and placed circumferentially about the cylinder wall. Thus, the safety ring 33 is inserted into the outer circumferential safety ring groove 35 of the cylinder wall 34.

Figure 8:
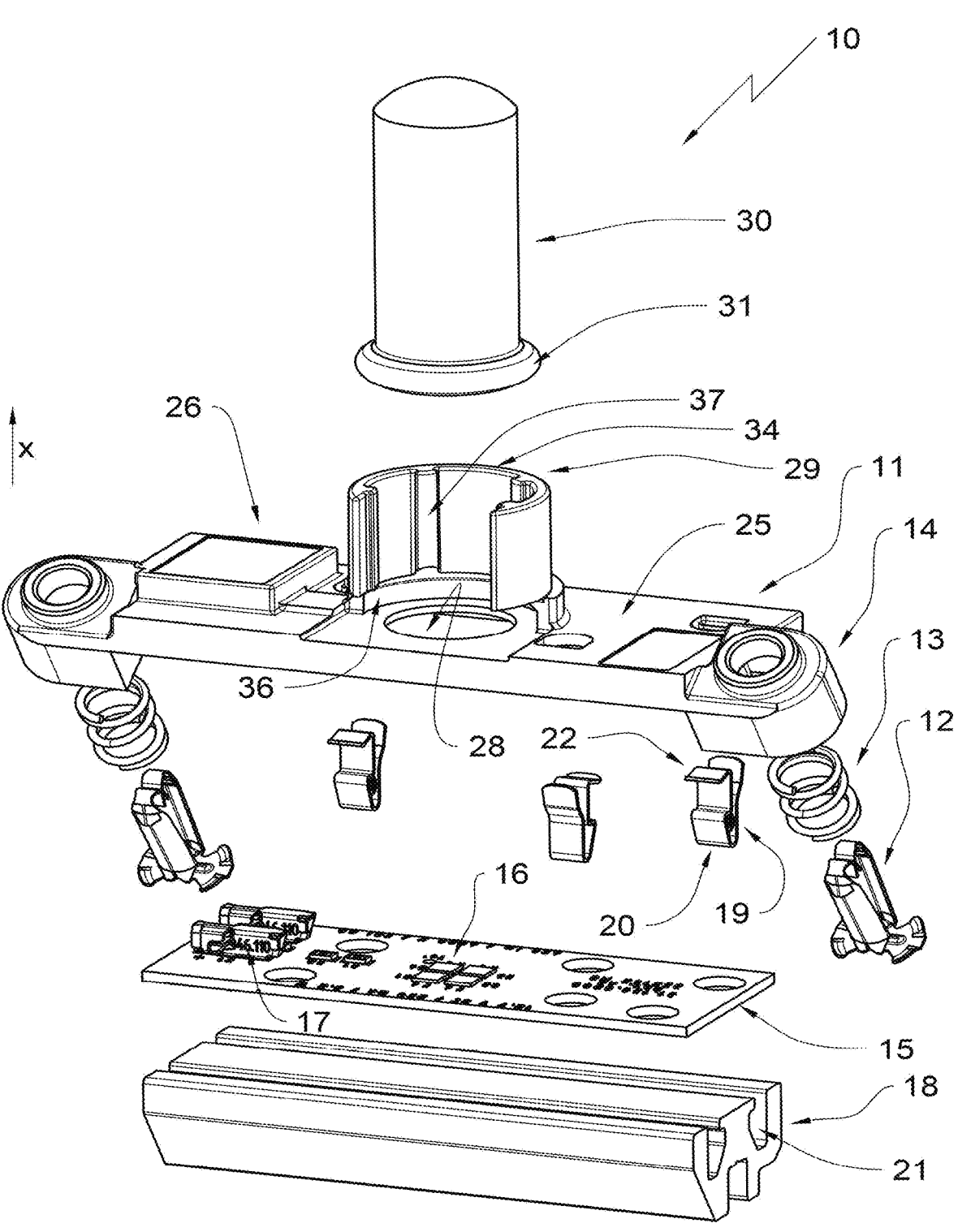
FIG. 8 illustrates a second embodiment of the invention in an exploded view.

FIG. 8 shows a cross-section of the front view of the light 10 according to the first embodiment showing the configuration of FIG. 6 in a different view. This view shows, however, how the terminals 17 are arranged below the receiving cover 26 of the holder 11.

FIGS. 8 through 12 show a second embodiment of the invention that is similar to the first embodiment. This is evident from the exploded view in FIG. 8. The general description provided with respect to FIGS. 1 and 2 also applies to the second embodiment.

Also here the holder 11 functions as a center component where the individual elements of the light 10 are combined. The circuit board 15 is applied to the holder 11 from a bottom side with the reaction bearing 18 configured as the cooling body. The holder 11 includes a fixing element 29 at a topside wherein the fixing element extends in the light exit direction and is configured as an essentially hollow cylindrical component with a cylinder wall 34 which penetrates the cover wall 25 of the holder 11 in a cutout 28. The cutout 28 facilitates feeding light emitted by the LED 16 into a light conductor rod 30.

The light conductor rod 30 is also configured as a circular cylindrical rod with a circumferential flange 31 analogous to the first embodiment wherein different cross-sections and alternative structures for the flange 31 can be provided as described with respect to embodiment 1.

It is evident that the second embodiment does not include a safety ring 33 as illustrated in FIG. 8 and that the fixing element 29 has a different configuration.

Also in the second embodiment, the fixing element 29 is formed by a cylinder wall 34 which is fixed at the cover wall 25 of the holder 11 over a circumferential angle of approximately 180 degrees and which forms a ring groove section 36 configured to receive the flange 31 of the light conductor rod 30 at an end proximal to the cover wall 25. Also here the cylinder wall 34 includes centering bars 37.

Due to the circumferential angle of the cylinder wall of 180 degrees, the fixing element has a circumferential relief cut or a circumferential opening that extends over a circumferential angle of 180 degrees also in this embodiment. Ends of the cylinder wall 34 located in the circumferential direction also respectively form a safety lobe 38. The safety lobe 38 is spring elastic and not connected to the cover wall 25. Each safety lobe 38 is radially movable relative to the cover wall 25. The safety lobes 38 are configured integrally in one piece with or bonded to the cylinder wall 34 in the embodiment 2 and engage the circumferential relief cut for the circumferential opening of the cylinder wall 34. This way the circumferential relief cut for the cylinder wall is 34 constricted.

Figure 9:
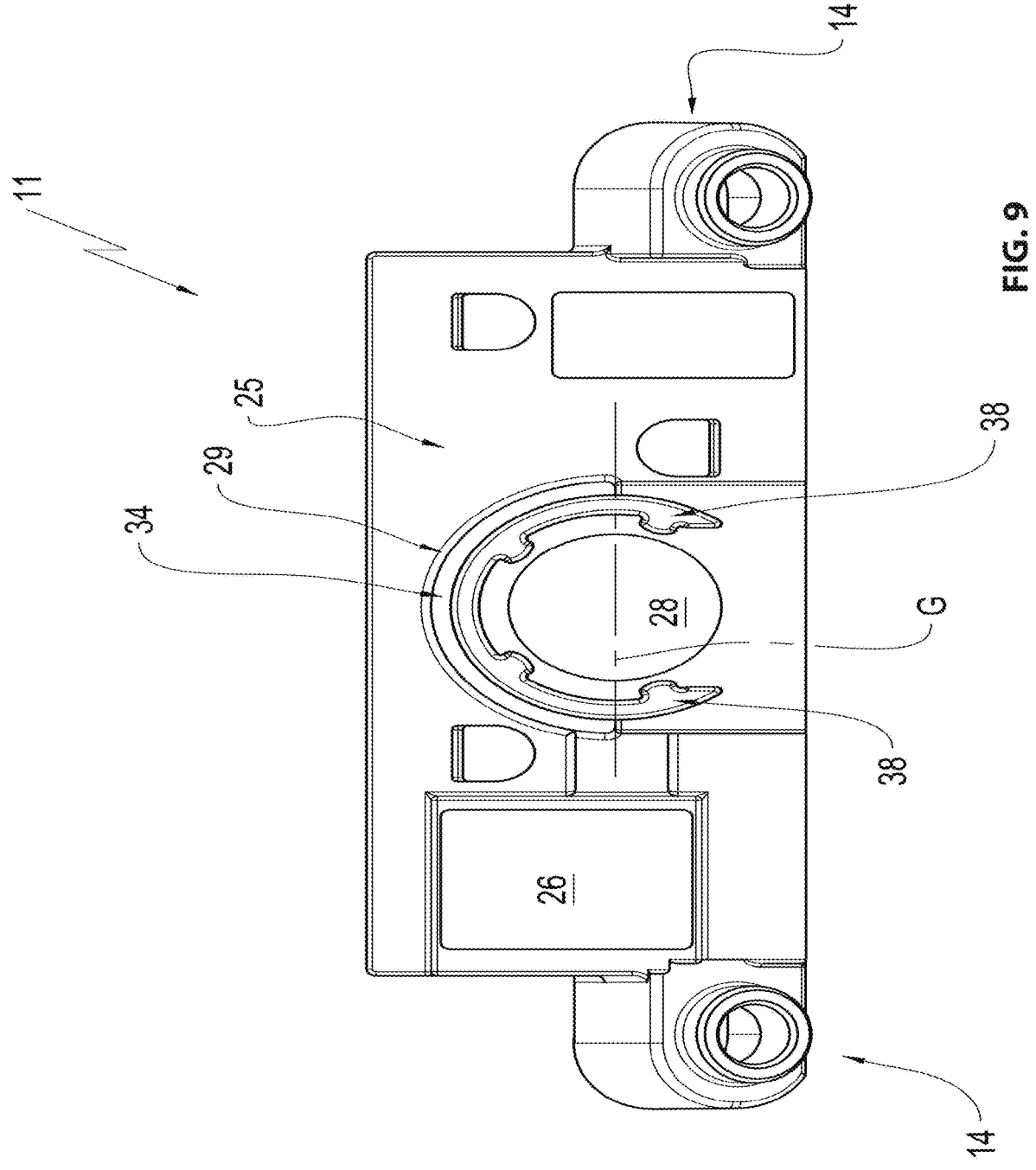
FIG. 9 illustrates a top view of the holder according to the embodiment according to FIG. 8.

This is shown again in a top view of the holder 11 according to FIG. 9. FIG. 9 shows how the cylinder wall 34 of the fixing element 29 envelopes the cutout 28 for the light pass through in a circumferential angle of approximately 180 degrees to the dashed boundary line G, wherein the circumferential opening for the circumferential relief cut of the cylinder wall 34 of the fixing element 29 is outside of the boundary line. The safety lobes 38 respectively adjoin the cylinder walls 34 and engage the circumferential relief cut so that the circumferential relief cut is constricted.

Figure 10A:
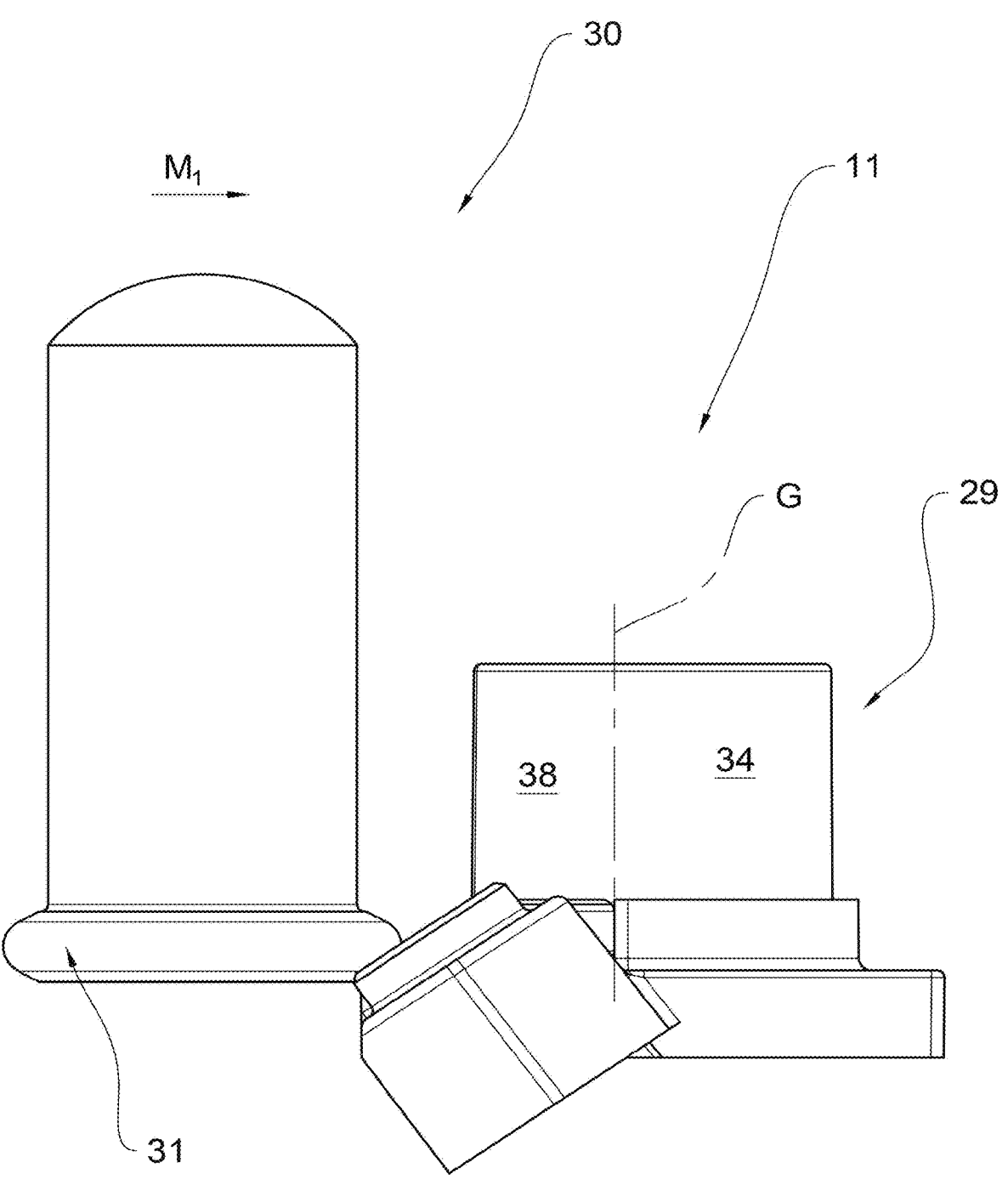
FIG. 10A illustrates a view of the holder and the light conductor rod according to the second embodiment according to FIG. 8 in a preassembled condition.
Figure 10B:
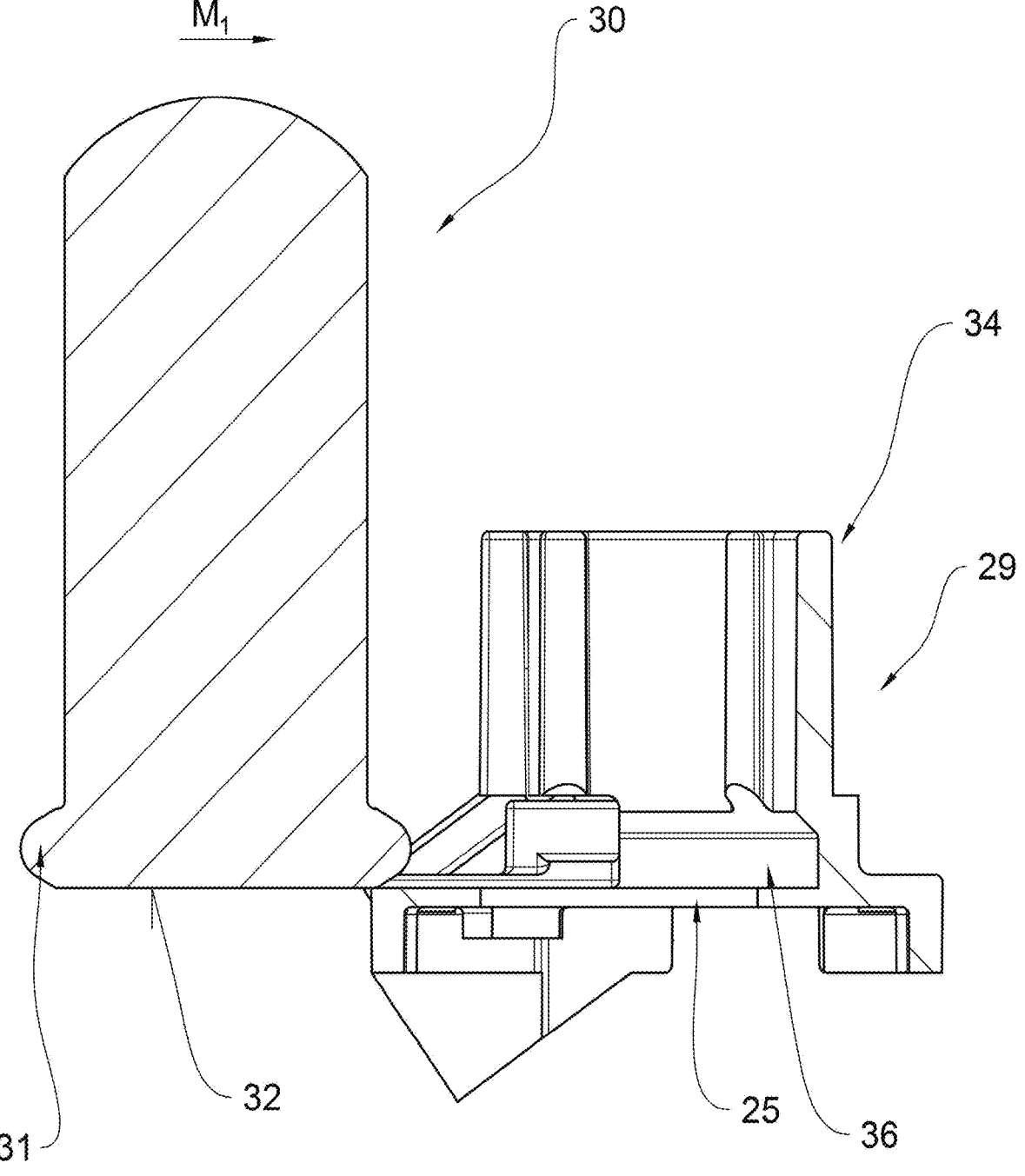
FIG. 10B illustrates a longitudinal sectional view of the holder and the light conductor rod according to FIG. 10A.

FIGS. 10A and 10B show the holder 11 and the light conductor rod 30 in a preassembled condition wherein FIG. 10B shows a vertical sectional view according to the FIG. 10A. Like in the first embodiment, the light exit surface 32 of the light conductor rod 30 is at a level of the surface of the cover wall 25 laterally from the circumferential opening of the cylinder wall 34 of the fixing element 29 in the preassembly position. The flange 31 is aligned with the ring groove section 36 so that an insertion of the light conductor rod 30 in the assembly direction M1 causes a penetration of the flange 31 into the ring groove section 36. The light conductor rod 30 thus passes the circumferential relief cut or the circumferential opening of the cylinder wall 34, wherein the safety lobes 38 illustrated in FIG. 10A are spread outward radially.

After the light conductor rod 30 passes through the circumferential relief cut of the cylinder wall 34 the safety lobes 38 contact the outer circumference of the light conductor rod 30 due to their elastic reset properties and thus restrict the circumferential opening. This reliably prevents the light conductor rod 30 from sliding out against the assembly direction M1.

Figure 11A:
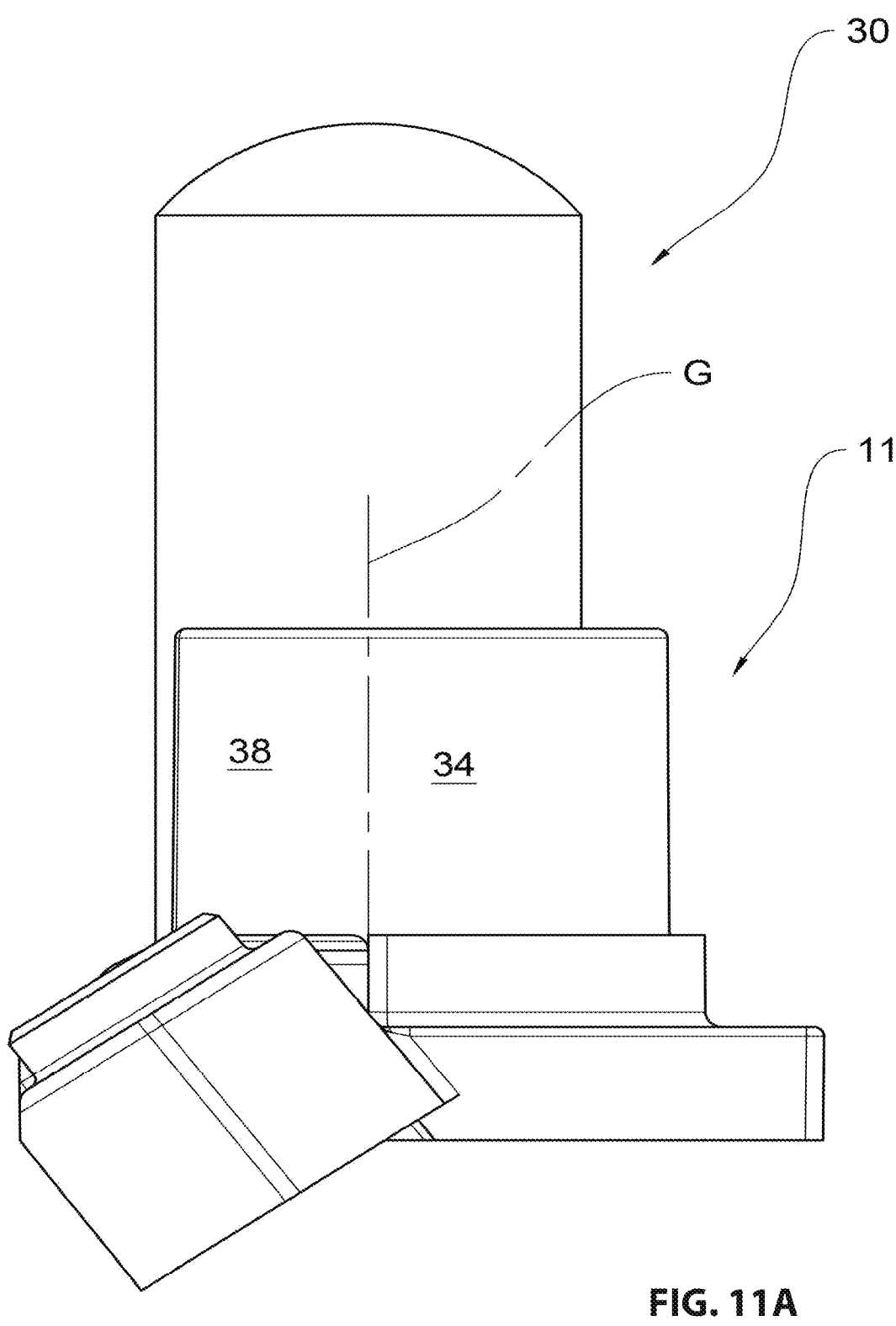
FIG. 11A illustrates the holder and the light conductor rod according to the second embodiment according to FIG. 8 in an assembled condition.
Figure 11B:
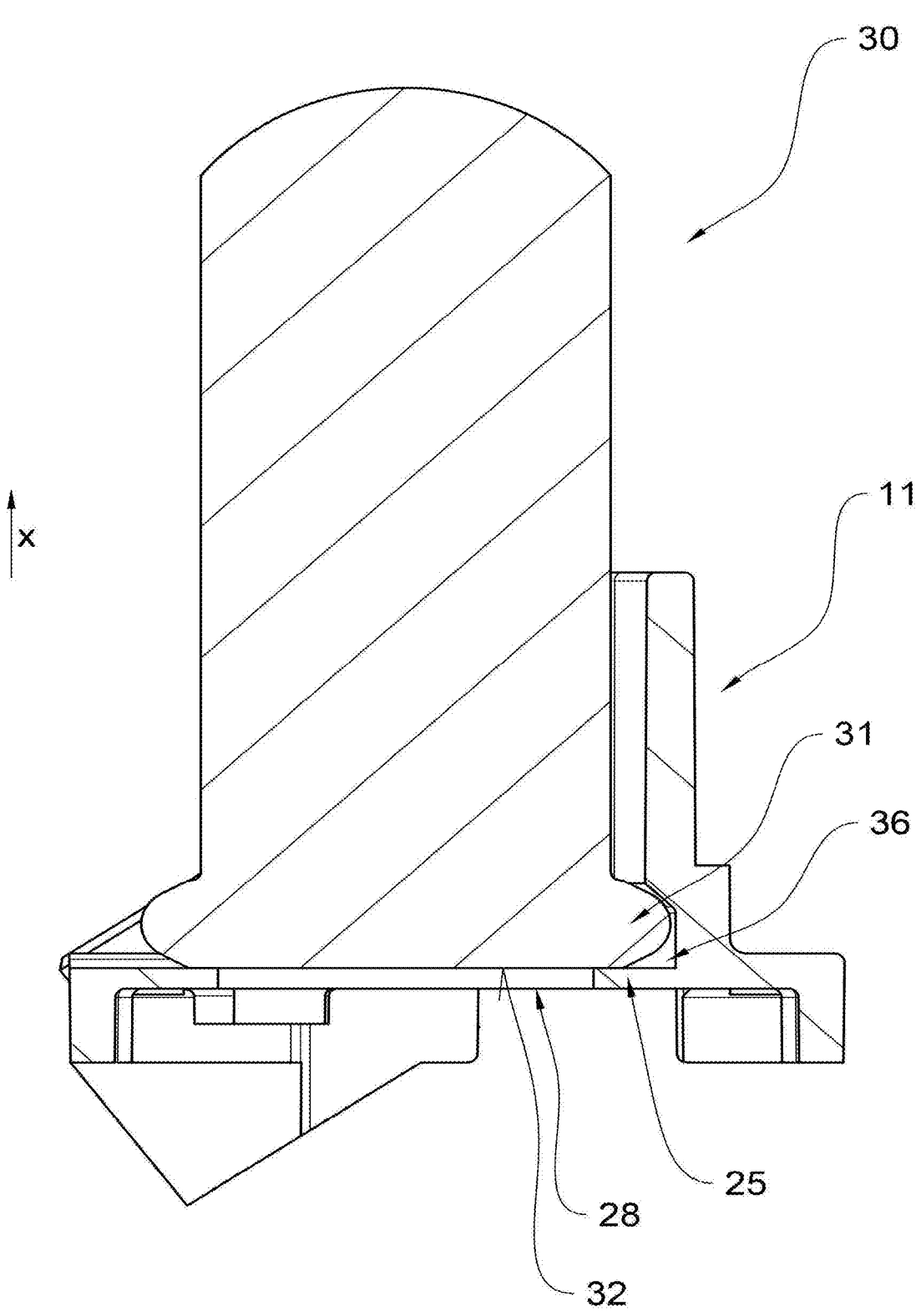
FIG. 11B illustrates a vertical sectional view of the embodiment according to FIG. 11A.

The assembly position of the holder 11 and the light conductor rod 30 is shown in FIGS. 11A and 11B, wherein FIG. 11B shows a vertical sectional view of FIG. 11A. It is shown that the light conductor rod 30 is arranged with its light entry surface 32 above the cut out 28 of the cover wall 25 of the holder 11 so that light emitted by the LED 16 can be fed into the light conductor rod 30.

FIG. 11 furthermore illustrates how the flange 31 of the light conductor rod 30 penetrates the ring section 36 so that the light conductor rod 30 is secured against sliding out in the light exit direction X.

FIG. 11A shows a side view of the light conductor rod 30 mounted in the holder 11. It is evident that the cylinder wall 34 envelops the light conductor rod 30 over a circumference angle of approximately 180 degrees and that the light conductor rod is furthermore supported in the portion of the circumferential relief cut of the contacting safety lobe and supported in the fixing element 29.

Figure 12:
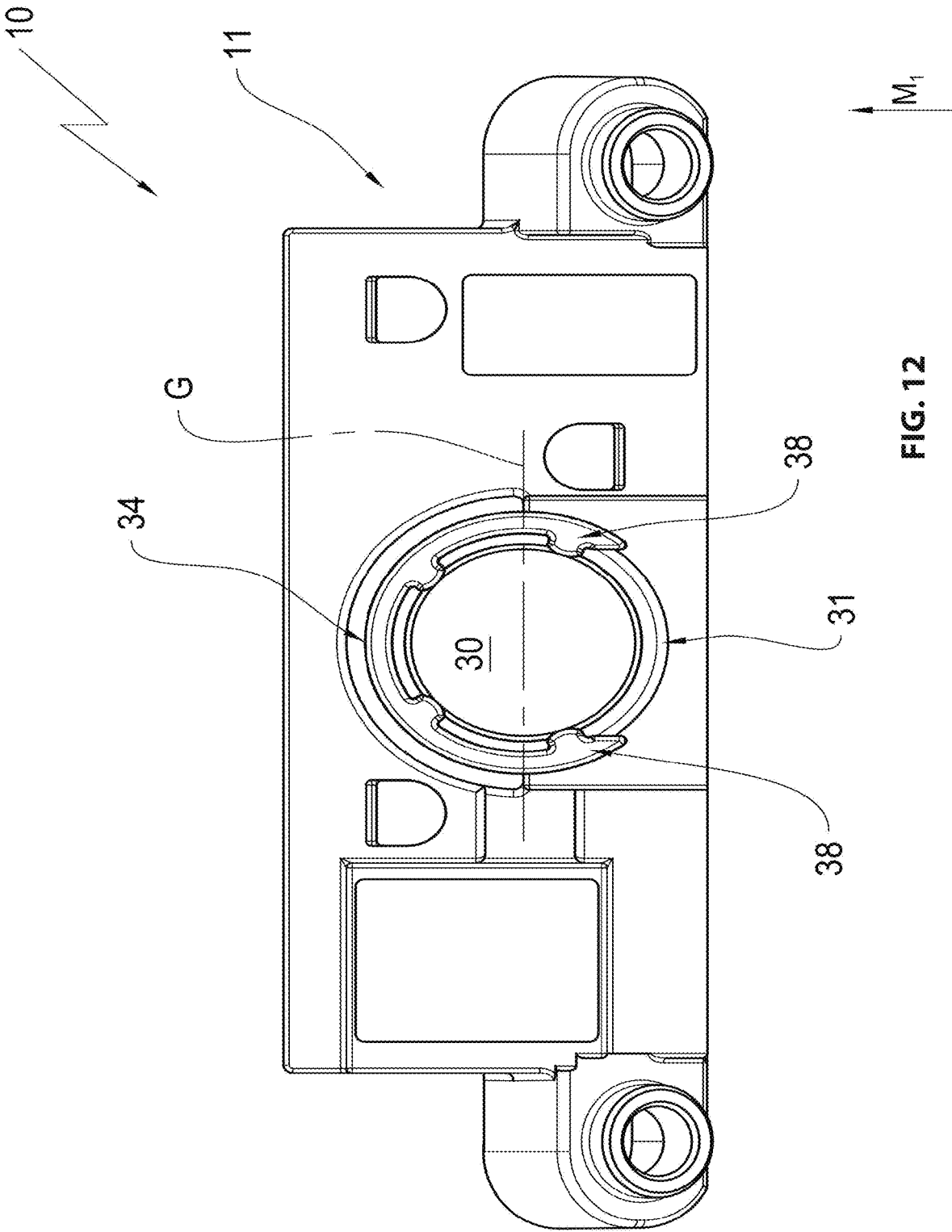
FIG. 12 illustrates a top view of the holder with the light conductor rod inserted according to the embodiment according to FIG. 8.

In this context reference is made to FIG. 12 showing a top view of the light 10. Thus, the light conductor rod 30 is inserted into the holder 11. The boundary line G shows the separation between the cylinder wall 34 and the safety lobes 38. FIG. 12 also shows how the safety lobes contact the outer circumference of the light conductor rod 30 securing the light conductor rod 30 in the holder 11 against sliding out against the mounting direction M1 by constricting the circumferential opening of the cylinder wall 34.

The embodiments 1 and 2 of the invention are characterized in that the light conductor rod 30 is inserted transversal to the light exit direction X through a circumferential opening of the cylinder wall 34 into the fixing element 29.

The embodiments 3 and 4 described infra have in common that the light conductor rod 30 is inserted in the light exit direction X from a bottom side of the holder 11 that is oriented towards the circuit board 15 through the cut out 28 and inserted into the fixing element 29.

Figure 13:
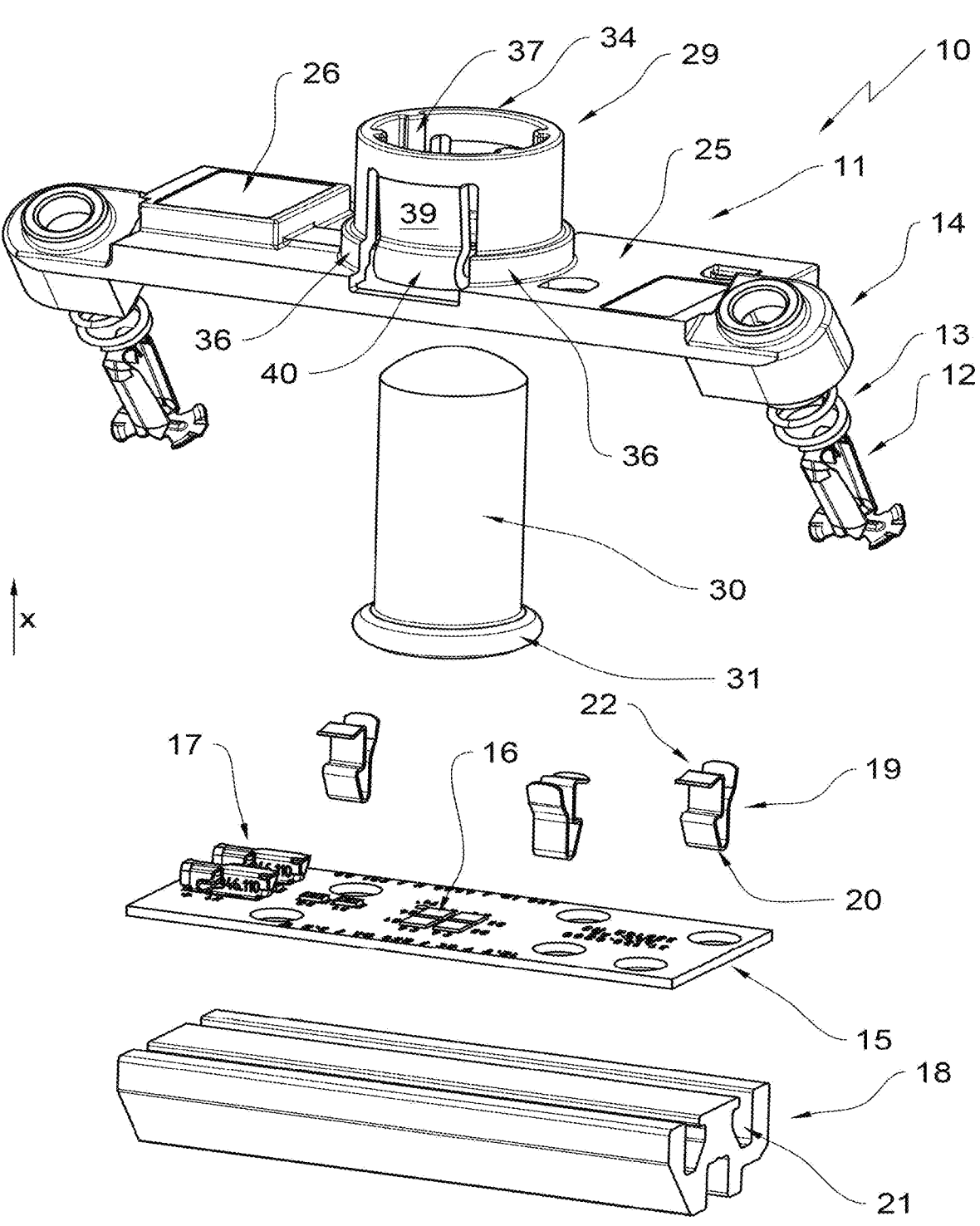
FIG. 13 illustrates a third embodiment of the invention in an exploded view.
Figure 14:
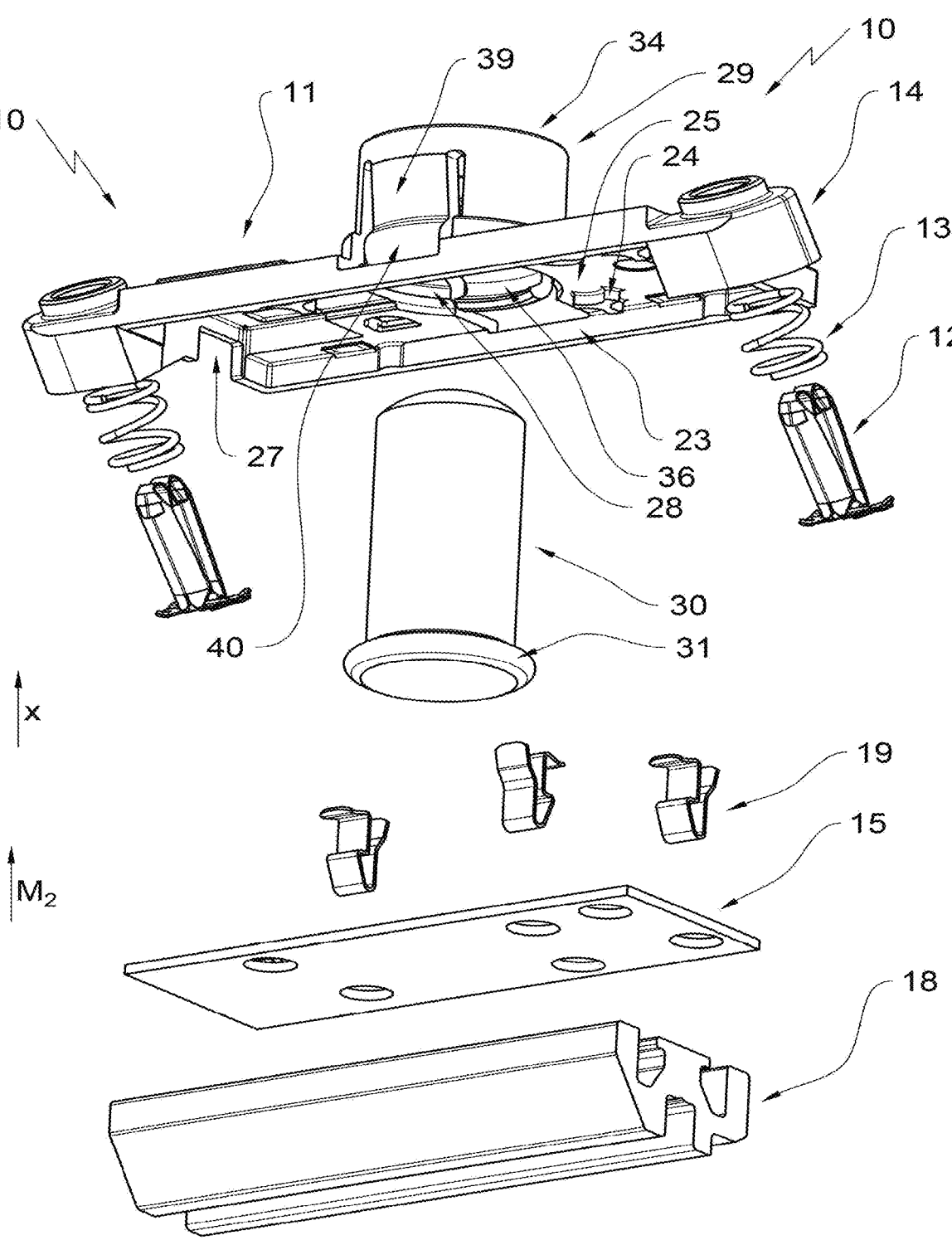
FIG. 14 illustrates the third embodiment according to FIG. 13 in a second exploded view.

The embodiment 3 is how described with reference to FIGS. 13-16. FIGS. 13 and 14 show exploded views analogous to FIGS. 1 and 2 of the first embodiment. Embodiment No. 3 is similar in principle to the preceding embodiments 1 and 2 so that the general description of the individual component and their interaction applies to the embodiment no. 3.

Looking at embodiment No. 3 it is evident that the fixing element includes a circumferentially closed cylinder wall 34 so that a lateral insertion of the light conductor rod 30 transversal to the light exit direction X into the fixing element 29 is not possible when the light conductor rod 30 is moved along the assembly direction M1.

Also, the fixing element 29 of the third embodiment of the invention forms an essentially circumferential annular groove at an end oriented towards the cover wall 25 wherein the annular groove is configured to receive the flange 31 of the light conductor rod 30. The annular groove is formed by two ring groove sections 36 that are arranged diametrically opposite to each other, wherein the two ring groove sections 36 are separated from each other by two interlocking tongues 39 that are also arranged diametrically opposite from each other. It is appreciated that a single interlocking tongue 39 suffices for the safety function that will be described infra and the two interlocking tongues illustrated herein constitute an advantageous embodiment.

Each interlocking tongue 39 represents a wall section of the cylinder wall 34, thus forms an integral or bonded component of the cylinder wall 34. Thus, an approximately U-shaped slot or relief cut is introduced into the cylinder wall 34, wherein the interlocking tongue 39 includes a free end proximal to the circuit board and the end of the interlocking tongue 39 that is distal from the circuit board is connected at the cylinder wall 34. Thus, the interlocking tongues 39 are mov able in a spring elastic manner in a radially outward direction. Each interlocking tongue 39 respectively includes an interlocking lip 40 at its free end.

As evident in particular from FIG. 14 the cut out 28 according to the third embodiment of the invention has a greater diameter than the cut out 28 of embodiments 1 and 2. The free diameter of the cut out 28 according to the third embodiment corresponds at least to the flange diameter of the light conductor rod 30. The light conductor rod 30 is now pushed from below through the cut out 28 along the assembly direction M2 until the flange 31 moves into the portion of the ends of the interlocking tongues 39 that are free proximal to the circuit board. A continuation of the insertion movement along the assembly direction M2 that substantially corresponds to the light exit direction causes an outward deflection of the interlocking tongues 39 until the interlocking lips 40 reach behind the flange 31.

Thus, the interlocking tongues 39 pivot back into their starting positions, and support the light conductor rod 30 against the mounting direction M2 in the fixing element 29.

Figure 15:
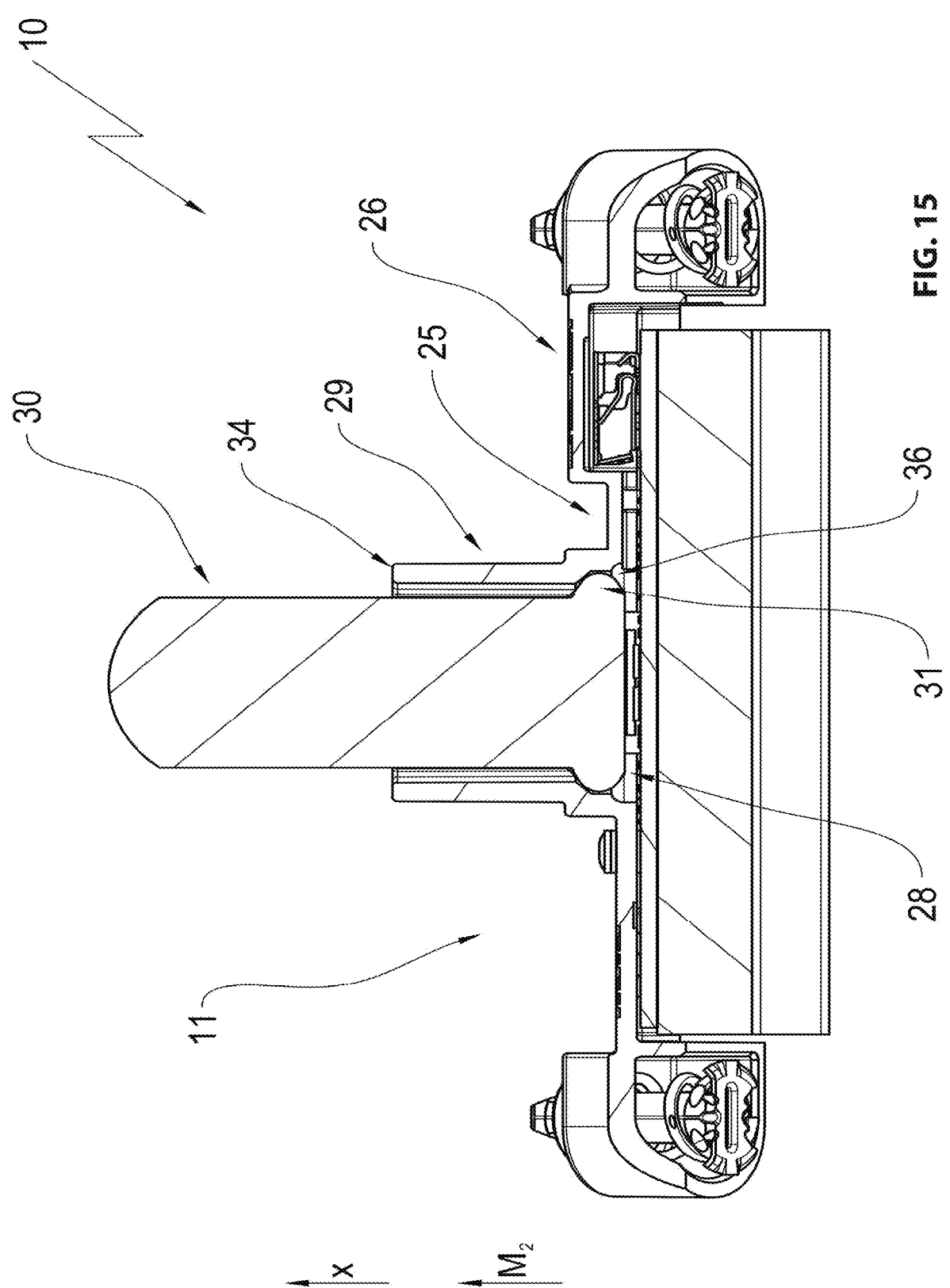
FIG. 15 illustrates the third embodiment of the invention according to FIG. 13 in a first vertical sectional view.
Figure 16:
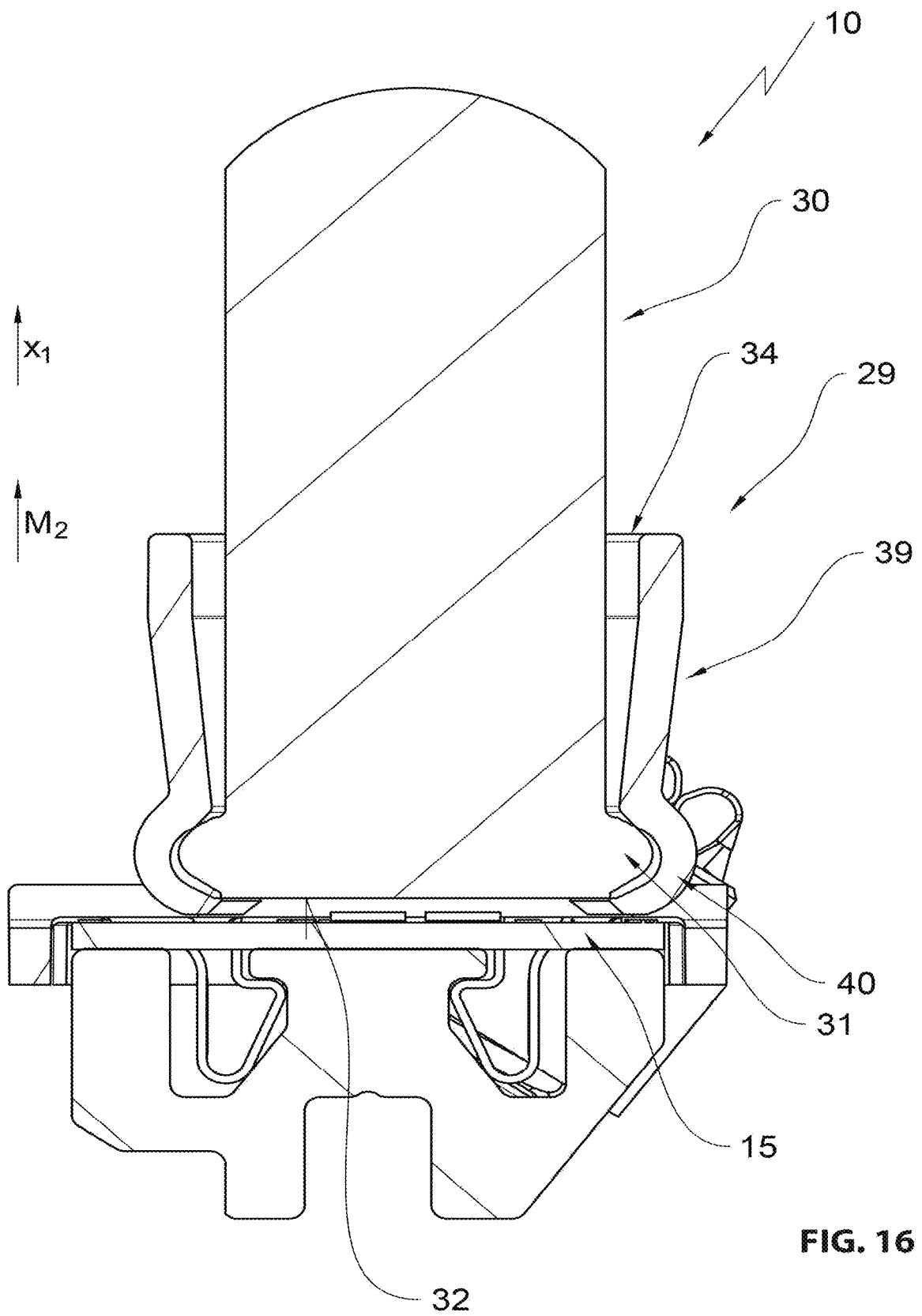
FIG. 16 illustrates the third embodiment of the invention according to FIG. 13 in a second vertical sectional view.

FIG. 15 shows the light 10 according to the third embodiment in a frontal vertical sectional view, showing that the cut out 28 has a diameter which allows a free passage of the flange 31 into the fixing element 29. It is additionally evident how the flange 31 is seated in the ring groove section 36 of the fixing element 29 so that continuing the movement along the mounting direction M2 is precluded and the light conductor rod 30 is secured in the light exit direction X in the fixing element 29.

FIG. 4 shows a sectional view through the light 10 along a vertical plane in a side view. The side view shows that the interlocking tongues 39 include interlocking lips 40 at a free end proximal to the circuit board 15 wherein the interlocking lips reach around the flange 31 and thus reliably prevent a sliding of the light conductor rod 30 out of the fixing element 29 against the assembly direction M₂. Additionally, the interlocking lips 40 assure a minimum distance between the circuit board 15 and the light entry surface 32 of the light conductor rod 30 so that the light conductor rod 30 does not contact the electronic components of the circuit board 15. Maintaining the distance between the light entry surface 32 of the light conductor rod 30 and the circuit board surface can also be assured by spacer elements like e.g. an elastomeric material ring arranged between the circuit board 15 and the light entry surface 32 or spacers arranged on the circuit board 15.

FIGS. 17-20 show a fourth embodiment of the invention. Also in this embodiment the light conductor rod 30 is inserted from below into the holder 11 along the assembly direction M₂.

Figure 17:
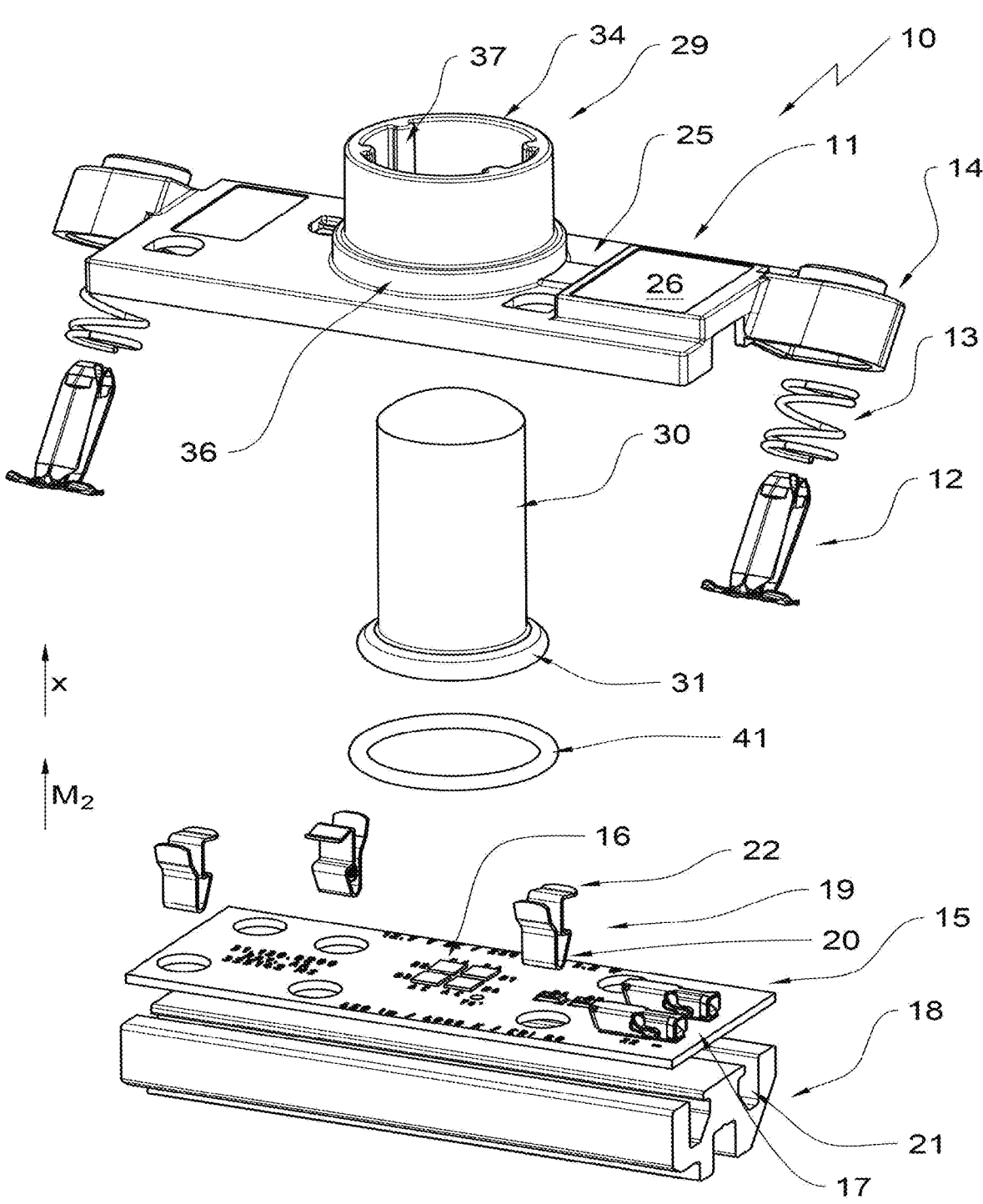
FIG. 17 illustrates a fourth embodiment of the invention in the exploded view.
Figure 18:
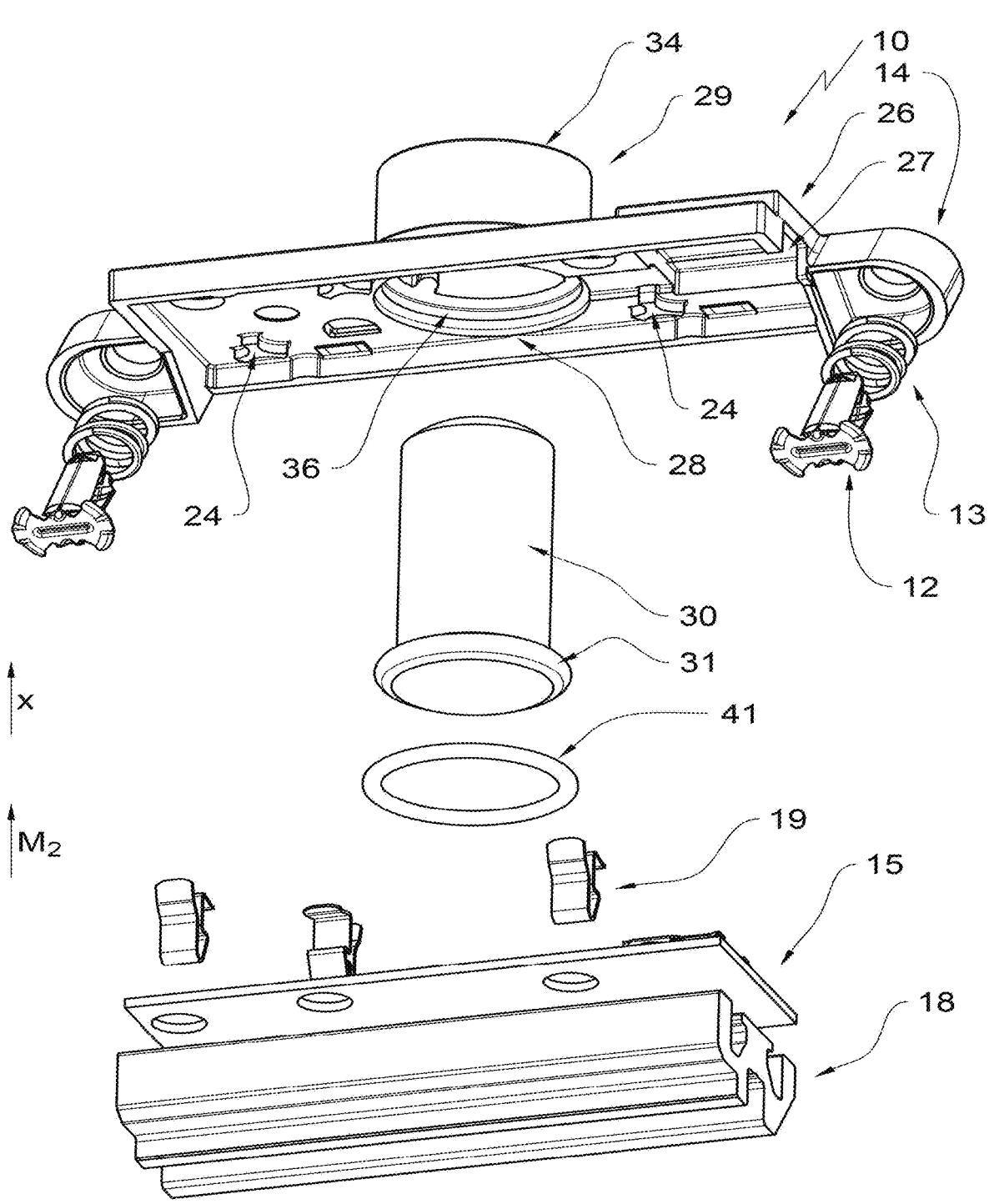
FIG. 18 illustrates the fourth embodiment of the invention in a second exploded view.

FIGS. 17 and 18 are now being referred to which are analogous to FIGS. 1 and 2 of the first embodiment showing individual components of the light 10 according to embodiment No. 4. Also, here the essential structures are similar to the first embodiment so that the description of FIGS. 1 and 2 is being referred to with respect to general properties that were described with respect to the first embodiment.

The essential difference over the preceding embodiments is in the configuration of the cylinder wall 34. The cylinder wall 34 envelops an entirety of the cut out 28. The cylinder wall 34 of the fourth embodiment is also configured completely closed which differs from the preceding embodiments. Thus, there is no circumferential opening or relief cut. Thus, the light conductor rod 30 is insertable into the fixing element 29 or the sleeve body formed by the cylinder wall 34 exclusively by inserting the light conductor rod 30 in the insertion direction M₂ or along the light exit direction X through the cut out 28 as evident in particular from FIG. 18 in this embodiment. Thus, a diameter of the cut out 28 is also sized in this embodiment so that the light conductor rod 30 including the flange 31 can pass through.

A spacer ring 41 is provided as an additional component in the fourth embodiment of the invention.

Figure 19:
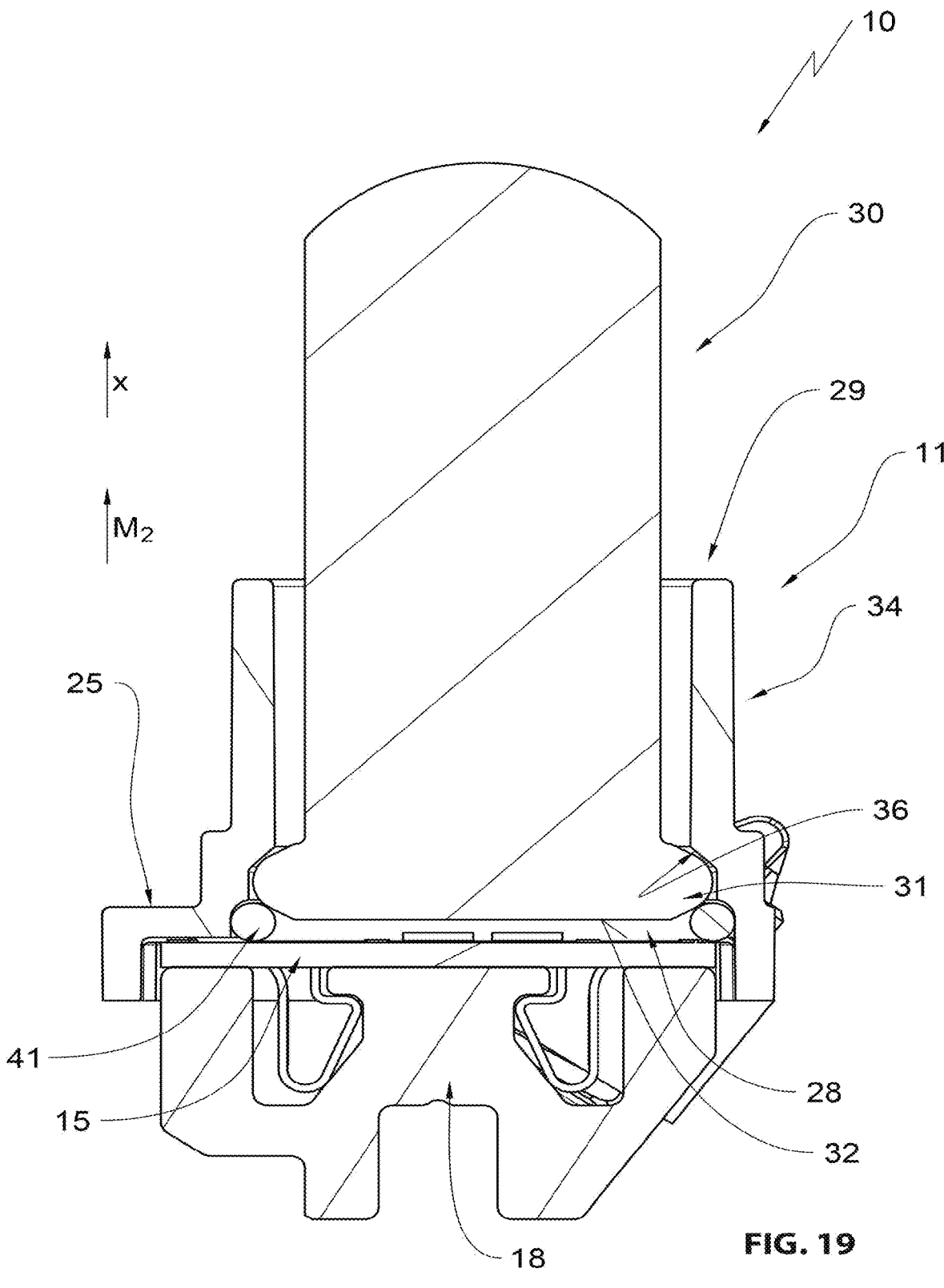
FIG. 19 illustrates the fourth embodiment of the invention in a first vertical sectional view.
Figure 20:
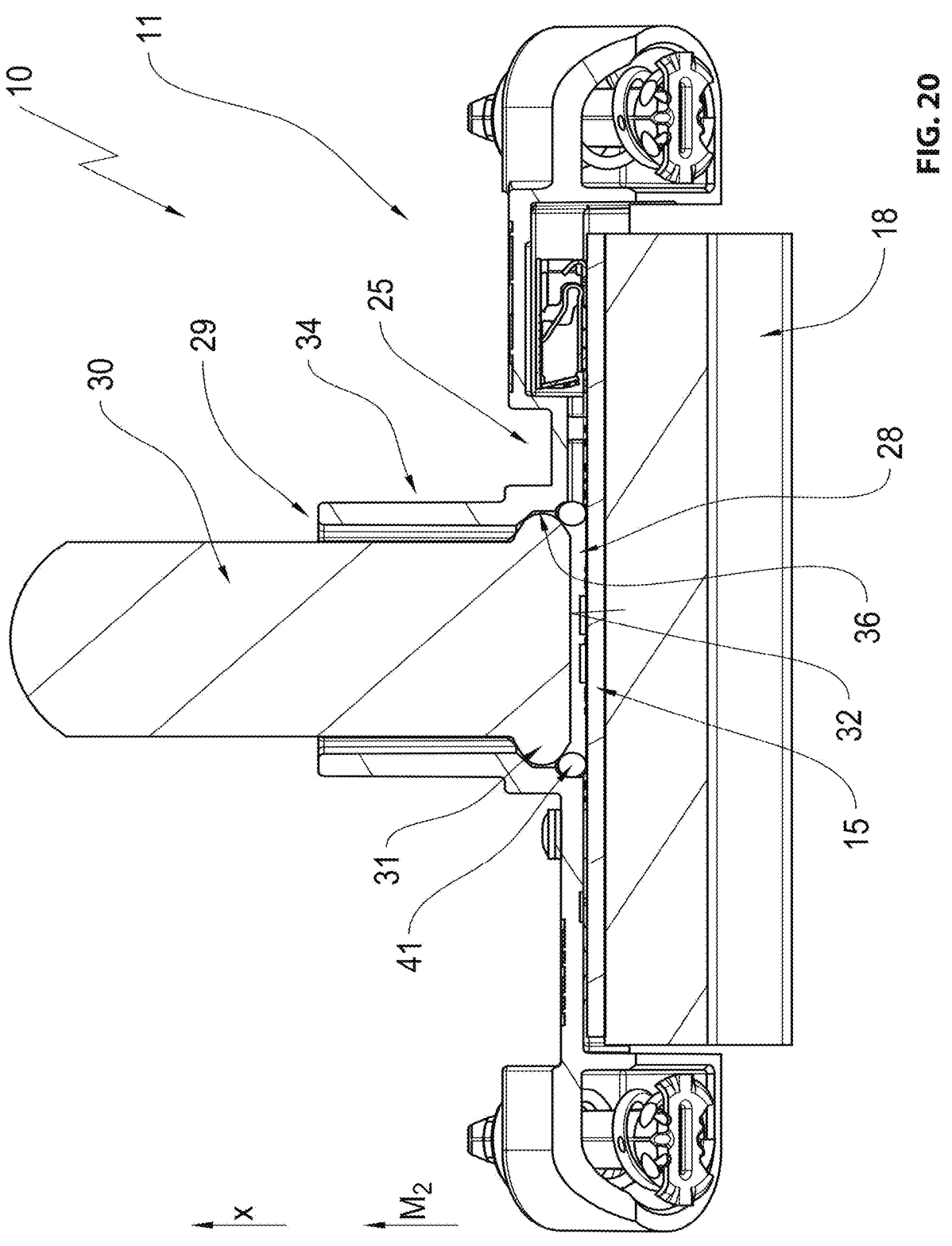
FIG. 20 illustrates the fourth embodiment of the invention according to FIG. 17 in a second vertical sectional view.

The exact fixing of the light conductor rod 30 in the holder 11 is now described in more detail based on two sectional views of the light 10 in FIGS. 19 and 20. FIG. 19 is a vertical sectional view of the light 10 in a side view. FIG. 20 shows a vertical sectional view of the front view of the light 10.

The light conductor rod 30 is inserted into the holder 11 along the mounting direction M₂ or along the light exit direction X. Thus, the light conductor rod 30 passes through the cut out 28 of the cover wall 25 of the holder 11. The circumferential flange is seated in the completely circumferential ring groove of the cylinder wall 34 so that the insertion movement of the light conductor rod 30 along the assembly direction M₂ is terminated. Thus, the light conductor rod 30 cannot slide out of the fixing element 29, in the light exit direction X.

After inserting the light conductor rod 30 the spacer ring 41 is placed below the flange 31 so that the circuit board 15 including the reaction bearing 18 is mounted at the holder 11. Thus, the spacer ring 41 contacts between the flange 31 and the circuit board 15 and prevents a back sliding of the light conductor rod 30 against the mounting direction M₂ to the circuit board 15. This way electronic components arranged on the circuit board 15, in particular the LED 16, are protected against contact with the light conductor rod 30.

The spacer ring 41 is advantageous configured as an elastomeric material component which is compressed at least slightly when the circuit board 15 is applied to the holder. This way the contact forces are generated that impact the light conductor rod 30 in the assembly direction and thus reliably retain the light conductor rod 30 in the annular groove 36.

The invention provides a novel light 10 for domestic appliances, in particular cooking appliances. The invention provides a form locking and reliable retention of the light conductor rod 30. This form locking is achieved by a circumferential protrusion of the light conductor rod 30, wherein the circumferential protrusion is seated in a corresponding recess of the holder 11 or the fixing element 29 of the holder 11. Advantageously the circumferential protrusion is configured as a flange 31 and the flange 31 is arranged at an end of the light conductor rod 30 which forms the light entry surface 32.

Four embodiments of the invention provide different options for mounting and securing the light conductor rod 30 in the fixing element 29.

It is appreciated that there is an option to provide a defined orientation of the light conductor rod 30 relative to the holder 11 with respect to axial rotation of the light conductor rod 30. Thus, clear cuts can be introduced into the flange 31, wherein pins arranged in the ring groove 36 or in the ring groove sections 36 engage the relief cuts. This reliably prevents a rotation of the light conductor rod 30 about its longitudinal axis. A number of the relief cuts in the flange 31 and their position, enables to code particular light conductor rods 30 for accordingly configured holders 11 so that predetermined light conductor rods 30 can be associated with predetermined holders 11, thus a coding function can be provided in addition to protection against rotation.

In addition to the advantageous form locking for fixing the light conductor rod 30 in the holder 11, the circumferential protrusion at the light conductor rod 30, in particular the flange 31, facilitates using a full cross section of the light conductor rod 30 for conducting the light. Light losses through circumferential cuts in the light conductor rod 30 are thus reliably prevented.

REFERENCE NUMERALS AND
DESIGNATIONS 10 light
11 holder
12 stud
13 coil spring
14 bolt receiver
15 circuit board
16 LED
17 terminal clamp
18 reaction bearing
19 interlocking spring element
20 base
21 attachment groove
22 support arm
23 circuit board receiver
24 spacer
25 cover wall
26 receiver
27 conductor insertion cut out
28 cut out
29 fixing element
30 light conductor rod
31 flange
32 light entry surface
33 safety ring
34 cylinder wall 35 safety ring groove
36 ring groove section
37 centering bar
38 safety lobe
39 interlocking tongue
40 interlocking lip
41 spacer ring
G boundary line
X light exit direction
M₁ mounting direction
M₂ mounting direction

What is claimed is:

1. A cooking appliance light, comprising:

an illuminant formed by a circuit board and a LED arranged on the circuit board;

a light conductor rod including a light entry surface for light emitted by the LED;

a holder including a circuit board receiver arranged on a bottom side of the holder, a fixing element arranged on a top side of the holder opposite to the bottom side and configured to receive the light conductor rod, and a cut out arranged in a portion of the fixing element wherein light emitted by the LED arranged on the bottom side of the holder radiates through the cut out to the light conductor rod arranged on the top side of the holder, wherein the light conductor rod includes an essentially circumferential annular protrusion arranged in a radial plane and integrally provided in one piece with or bonded to the light conductor rod, wherein the light conductor rod is fixed in the fixing element of the holder by the essentially circumferential annular protrusion by positive form locking, wherein the essentially circumferential annular protrusion is an essentially circumferential flange arranged at an end of the light conductor rod proximal to the light entry surface of the light conductor rod, wherein the fixing element of the holder is a hollow cylinder with a cylinder wall that includes an inner circumferential recess configured as a ring groove section or a ring groove in a radial plane, wherein the circumferential protrusion of the light conductor rod is seated in the ring groove section or the ring groove fixed by positive form locking wherein the ring groove section or the ring groove is formed at an end of the cylinder wall that is proximal to the holder, wherein the cylinder wall of the fixing element is circumferentially closed at an end that is distal from the holder, and wherein the light conductor rod is inserted in a light exit direction through the cutout into the fixing element.

2. The cooking appliance light according to claim 1, wherein an interlocking tongue is cut out of the cylindrical wall, and wherein a free end of the interlocking tongue proximal to the circuit board flexes out radially in a spring elastic manner and interlocks at the flange of the light conductor rod.

* * * * *